United States Patent
Miyoshi et al.

(10) Patent No.: US 12,304,404 B2
(45) Date of Patent: May 20, 2025

(54) ATTACHMENT STRUCTURE FOR FUNCTIONAL COMPONENT AND INTERIOR MEMBER

(71) Applicant: TS TECH CO., LTD., Saitama (JP)

(72) Inventors: Takako Miyoshi, Tochigi (JP); Jinichi Tanabe, Tochigi (JP); Yuki Oshima, Tochigi (JP); Masahiro Nomura, Tochigi (JP); Yuta Oshino, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 79 days.

(21) Appl. No.: 18/550,713

(22) PCT Filed: Mar. 18, 2022

(86) PCT No.: PCT/JP2022/012786
§ 371 (c)(1),
(2) Date: Sep. 15, 2023

(87) PCT Pub. No.: WO2022/196810
PCT Pub. Date: Sep. 22, 2022

(65) Prior Publication Data
US 2024/0157895 A1   May 16, 2024

Related U.S. Application Data

(60) Provisional application No. 63/163,151, filed on Mar. 19, 2021.

(30) Foreign Application Priority Data

Mar. 31, 2021  (JP) .................................. 2021-061788
Mar. 31, 2021  (JP) .................................. 2021-061789
Mar. 31, 2021  (JP) .................................. 2021-061790

(51) Int. Cl.
*B60R 16/03*   (2006.01)
*B60N 2/90*    (2018.01)
(Continued)

(52) U.S. Cl.
CPC ................ *B60R 16/03* (2013.01); *B60N 2/90* (2018.02); *B60N 3/002* (2013.01); *B60R 11/0217* (2013.01); *B60R 13/02* (2013.01)

(58) Field of Classification Search
CPC ..... B60R 16/03; B60R 11/0217; B60R 13/02; B60N 2/90; B60N 3/002
See application file for complete search history.

(56) References Cited

U.S. PATENT DOCUMENTS

2018/0208317 A1*  7/2018  Heidtmann ........ B64D 11/0691
2020/0369195 A1  11/2020  Nishikawa et al.
(Continued)

FOREIGN PATENT DOCUMENTS

JP   2000-272397 A   10/2000
JP   2005-263133 A    9/2005
(Continued)

OTHER PUBLICATIONS

International Search Report mailed on May 31, 2022, for corresponding PCT application No. PCT/JP2022/012786, with English machine translation.

*Primary Examiner* — Jared Fureman
*Assistant Examiner* — Duc M Pham
(74) *Attorney, Agent, or Firm* — Michael Best & Friedrich LLP

(57) ABSTRACT

An attachment structure and an interior component is capable of supplying electric power to a functional component even when a vehicle is stopped. The functional component includes a first functional component attached to a fitting portion of an interior member, the fitting portion capable of supplying electric power, and a second functional component attached to the first functional component. The first functional component includes a first power receiver receiving the supply of the electric power from the fitting portion, a power storage storing the electric power, a power (Continued)

supply supplying the electric power to the first functional component and the second functional component, and an opening for connecting the second functional component. The second functional component includes an insertion inserted into the opening, and a second power receiver that receives the supply of the electric power from the first functional component when the insertion is inserted into the opening.

10 Claims, 20 Drawing Sheets

(51) Int. Cl.
*B60N 3/00* (2006.01)
*B60R 11/02* (2006.01)
*B60R 13/02* (2006.01)

(56) References Cited

U.S. PATENT DOCUMENTS

2023/0158976 A1* 5/2023 Miyoshi ................ B60R 16/03
307/9.1
2023/0331387 A1* 10/2023 Senechal ............ B64D 11/0606

FOREIGN PATENT DOCUMENTS

| | | |
|---|---|---|
| JP | 2008-184106 A | 8/2008 |
| JP | 2009-125276 A | 6/2009 |
| JP | 2017-114382 A | 6/2017 |
| JP | 2019-182087 A | 10/2019 |
| JP | 2020-192829 A | 12/2020 |

* cited by examiner

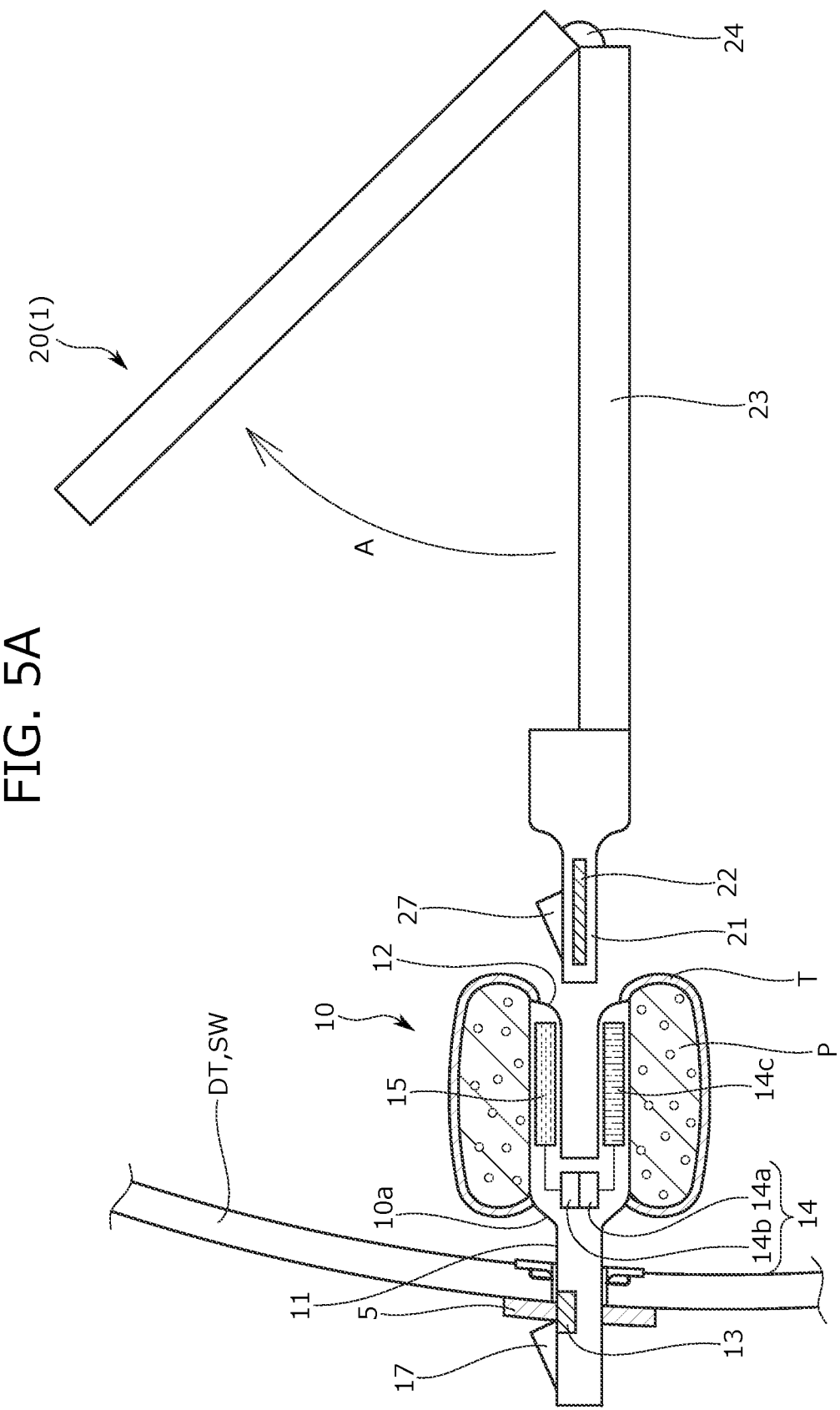

ATTACHMENT STRUCTURE FOR FUNCTIONAL COMPONENT AND INTERIOR MEMBER

CROSS-REFERENCE TO RELATED APPLICATIONS

This application is a National Entry application of PCT Application Serial Number PCT/JP2022/012786 filed on Mar. 18, 2022. Further, this application claims priority from U.S. Provisional Application No. 63/163,151, filed on Mar. 19, 2021, Japanese Patent Application Number 2021-061788, filed on Mar. 31, 2021, Japanese Patent Application Number 2021-061789, filed on Mar. 31, 2021, and Japanese Patent Application Number 2021-061790, filed on Mar. 31, 2021, the entire contents of which are hereby incorporated by reference into this application.

TECHNICAL FIELD

The present invention relates to an attachment structure for a functional component and an interior member, particularly to a structure for attaching a functional component to an interior member for a conveyance and an interior member having the structure.

BACKGROUND ART

PATENT LITERATURE 1 discloses a structure in which a conductive portion on an interior member side and a conductive portion on a functional component side are brought into contact with each other by locking a locking portion of a functional component such as an illumination device or a speaker to a hole edge portion of a through hole of an interior member, so that the conductive portion on the interior member side and the functional component are electrically connected.

In the structure described in PATENT LITERATURE 1, an electric power supply can be received during driving of a vehicle. On the other hand, since the structure is such that an electric power supply is received only from the interior member, an electric power supply cannot be received when the vehicle is stopped. For this reason, a demand to supply electric power to the functional component even in a situation where an electric power supply is not received cannot be met, which is a problem.

In addition, PATENT LITERATURE 2 discloses a cabin set in which an attachment such as a chair unit or a kitchen unit is attachable to rails provided on an inner surface of a cabin.

In the technique described in PATENT LITERATURE 2, a functional component such as an attachment is only provided on the rails, so that there is room for further examination on utilization and layout.

CITATION LIST

Patent Literature

PATENT LITERATURE 1: JP 2019-182087 A
PATENT LITERATURE 2: JP 2020-192829 A

SUMMARY OF INVENTION

Technical Problem

The present invention has been made in view of a problem of desiring to supply electric power to a functional component even in a situation where an electric power supply is not received, and an object of the present invention is to provide an attachment structure and an interior component capable of supplying electric power to a functional component attached to an interior member even when a vehicle is stopped.

In addition, the present invention has been made in view of another problem of desiring to further utilizing the functional component, and an object of the present invention is to provide an attachment structure for a functional component with an increased degree of freedom in the layout of the functional component, and an interior member.

Solution to Problem

The foregoing problem is solved by an attachment structure for a functional component to be attached to an interior member of a conveyance. The functional component includes a first functional component to be attached to a fitting portion of the interior member, the fitting portion being capable of supplying electric power, and a second functional component to be attached to the first functional component. The first functional component includes a first power receiving unit that receives the supply of the electric power from the fitting portion, a power storage unit that stores the electric power, a power supply unit that supplies the electric power to the first functional component and the second functional component, and an opening portion for connecting the second functional component. The second functional component includes an insertion portion to be inserted into the opening portion, and a second power receiving unit that receives the supply of the electric power from the first functional component in a state where the insertion portion is inserted into the opening portion.

Since the first functional component functions as a support portion for attaching the second functional component, and the first functional component includes the power storage unit that stores the electric power, the electric power can be supplied to the functional component attached to the interior member even when a vehicle is stopped.

In addition, in the attachment structure for the functional component, the power supply unit may include a first power supply circuit that supplies the electric power to the first functional component, and a second power supply circuit that supplies the electric power to the second functional component, and may be switchable between the first power supply circuit and the second power supply circuit.

The power supply destination of the functional component is switchable as needed.

In addition, in the attachment structure for the functional component, the power supply unit may include a power transmission coil, the second power receiving unit of the second functional component may include a power receiving coil, and the electric power may be supplied from the power supply unit of the first functional component to the second power receiving unit of the second functional component in a non-contact manner by bringing the power receiving coil closer to the power transmission coil.

Since the electric power is supplied in a non-contact manner, waterproof and antifouling can be achieved without electrodes exposed.

In addition, in the attachment structure for the functional component, the second functional component may include a table portion and a power supply jack capable of supplying the electric power supplied from the first functional component, to an external component.

Since the power supply jack is provided, the electric power can be supplied to an external component placed on a table, for example, a smartphone or a music player.

In addition, in the attachment structure for the functional component, the table portion of the second functional component may be foldable.

Since the table portion is foldable, an accommodation space can be made compact.

In addition, the attachment structure for the functional component, the first functional component may have a speaker function.

Since the first functional component has a speaker function, sound can be emitted from near an occupant.

In addition, in the attachment structure for the functional component, the interior member may be a door trim for a conveyance.

The functional component is attachable to the door trim, so that the functional component can be disposed close to the occupant.

In addition, in the attachment structure for the functional component, the interior member may be a conveyance seat.

The functional component can be disposed close to the occupant seated behind the conveyance seat.

In addition, in the attachment structure for the functional component, the conveyance seat may be a seat that is foldable by putting a seating portion upright, and may include a fitting portion to which the first functional component and/or the second functional component is attached and which is capable of supplying the electric power, on a back surface of the seating portion.

Since the conveyance seat is folded, the functional component can be disposed while widening a space for the feet of the occupant.

In addition, the foregoing problem is solved by an interior member including the attachment structure for the functional component.

The interior member including the attachment structure for the functional component can supply electric power to the functional component even when a vehicle is stopped.

The other foregoing problem is solved by an attachment structure for a functional component to be attached to an interior member of a conveyance. The functional component includes a first functional component to be attached to a fitting portion of the interior member, the fitting portion being capable of supplying electric power, and a second functional component to be attached to the first functional component. The first functional component includes an opening portion for connecting the second functional component. The second functional component includes an insertion portion to be inserted into the opening portion.

Since the first functional component functions as a support portion for attaching the second functional component, the degree of freedom in the layout of the functional component is increased.

In addition, in the attachment structure for the functional component, the fitting portion of the interior member may be formed in a predetermined groove shape, and the first functional component may include a connection portion having a protruding shape, formed according to the predetermined groove shape, and fittable into the fitting portion.

Since the fitting portion is formed in the predetermined groove shape, the attachment structure can be standardized, so that various attachments other than the functional component are attachable.

In addition, in the attachment structure for the functional component, the fitting portion of the interior member may be provided inside a recess recessed from a surface of the interior member, and a flap may be provided around an opening of the recess.

Since the flap is provided around the opening of the recess, when the functional component is not attached, the intrusion of dust or debris can be suppressed.

In addition, in the attachment structure for the functional component, the first functional component may include a first power receiving unit that receives the supply of the electric power from the fitting portion, and a power supply unit that supplies the electric power to the first functional component and the second functional component. The second functional component may include a second power receiving unit that receives the supply of the electric power from the first functional component in a state where the insertion portion is inserted into the opening portion.

The electric power can be supplied to the first functional component and the second functional component.

In addition, in the attachment structure for the functional component, the power supply unit may include a power transmission coil, the second power receiving unit of the second functional component may be a power receiving coil, and the electric power may be supplied from the power supply unit of the first functional component to the second power receiving unit of the second functional component in a non-contact manner by bringing the power receiving coil closer to the power transmission coil.

In addition, since the electric power is supplied in a non-contact manner, waterproof and antifouling can be achieved without electrodes exposed.

In addition, in the attachment structure for the functional component, the second functional component may include a table portion, and the table portion may be foldable.

Since the table portion is foldable, an accommodation space can be made compact.

In addition, in the attachment structure for the functional component, the interior member may be a door trim for a conveyance.

The functional component is attachable to the door trim, so that the functional component can be disposed close to an occupant.

In addition, in the attachment structure for the functional component, the interior member may be a conveyance seat.

Since the interior member is a conveyance seat, the functional component can be disposed close to the occupant seated behind the conveyance seat.

In addition, in the attachment structure for the functional component, the interior member may be a conveyance seat that is foldable by putting a seating portion upright, the recess may be provided on a back surface of the seating portion, and the fitting portion to which the connection portion of the first functional component and/or the insertion portion of the second functional component is attached may be provided inside the recess.

Since the conveyance seat is folded, the functional component can be disposed while widening a space for the feet of the occupant.

In addition, the other foregoing problem is solved by an interior member including the attachment structure for the functional component.

Since the first functional component functions as a support portion for attaching the second functional component, the degree of freedom in the layout of the functional component is increased.

Advantageous Effects of Invention

According to the present invention, since the first functional component functions as a support portion for attaching the second functional component, and the first functional component includes the power storage unit that stores the electric power, the electric power can be supplied to the functional component attached to the interior member even when the vehicle is stopped.

In addition, the power supply destination of the functional component is switchable as needed.

In addition, since the electric power is supplied in a non-contact manner, waterproof and antifouling can be achieved without electrodes exposed.

Since the power supply jack is provided, the electric power can be supplied to an external component placed on a table, for example, a smartphone or a music player.

Since the table portion is foldable, an accommodation space can be made compact.

Since the first functional component has a speaker function, sound can be emitted from near the occupant.

The functional component is attachable to the door trim, so that the functional component can be disposed close to the occupant.

Since the interior member is a conveyance seat, the functional component can be disposed close to the occupant seated behind the conveyance seat.

Since the conveyance seat is folded, the functional component can be disposed while widening a space for the feet of the occupant.

In addition, the interior member including the attachment structure for the functional component can supply electric power to the functional component even when the vehicle is stopped.

In addition, according to the present invention, since the first functional component functions as a support portion for attaching the second functional component, the degree of freedom in the layout of the functional component is increased.

In addition, since the fitting portion is formed in the predetermined groove shape, the attachment structure can be standardized, so that various attachments other than the functional component are attachable.

In addition, since the flap is provided around the opening of the recess, when the functional component is not attached, the intrusion of dust or debris can be suppressed.

In addition, since the power supply unit is provided, the electric power can be supplied to the first functional component and the second functional component.

In addition, since the electric power is supplied in a non-contact manner, waterproof and antifouling can be achieved without electrodes exposed.

In addition, since the table portion is foldable, an accommodation space can be made compact.

In addition, the functional component is attachable to the door trim, so that the functional component can be disposed close to the occupant.

In addition, since the interior member is a conveyance seat, the functional component can be disposed close to the occupant seated behind the conveyance seat.

In addition, since the conveyance seat is folded, the functional component can be disposed while widening a space for the feet of the occupant.

BRIEF DESCRIPTION OF DRAWINGS

FIG. 5A is a cross-sectional view taken along line V-V of FIG. 4, and is a view showing a state before the table is connected to the armrest.

DESCRIPTION OF EMBODIMENTS

First Embodiment

An attachment structure for a functional component according to a first embodiment of the present invention will be described with reference to the drawings.

However, the embodiment to be described below is provided to facilitate understanding of the present invention, and does not limit the present invention. Namely, the present invention can be modified and improved without departing from the concept of the present invention, and it goes without saying that the present invention includes equivalents of the present invention.

In addition, in the following description, the contents relating to the materials, shapes, and sizes of components constituting an interior member and a functional component are provided as merely one specific example, and do not limit the present invention.

Incidentally, hereinafter, an attachment structure for a functional component which is provided on a side surface of a vehicle interior will be described as one example of an interior member for a conveyance. However, the present invention is not limited to interior members for vehicles mounted in ground traveling conveyances including wheels, such as an automobile and a train, and can also be applied to, for example, interior members mounted in an aircraft, a ship, or the like moving in environments other than the ground.

Incidentally, hereinafter, examples of the functional component include an armrest and a table device that are functional components provided in a conveyance automobile (vehicle V) such as a minivan, and configuration examples of the functional components will be described.

In addition, in the following description, a "front to rear direction" is a front to rear direction of the vehicle V, and is a direction coinciding with a forward movement direction of the vehicle when traveling. In addition, a "width direction" is a lateral width direction of the vehicle V, and is a direction coinciding with a right to left direction when viewed from an occupant seated in a vehicle seat S. In addition, an "up to down direction" is an up to down direction of the vehicle V, and is a direction coinciding with a vertical direction when the vehicle V travels on a horizontal surface. In addition, an "outer side" being simply referred to indicates a side closer to the outside in a direction from a center of the vehicle toward the outside, and an "inner side" being referred to means a side closer to the center in a direction from the outside of the vehicle V toward the center. In addition, an "interior side" means a direction toward the vehicle interior.

Figure 1:
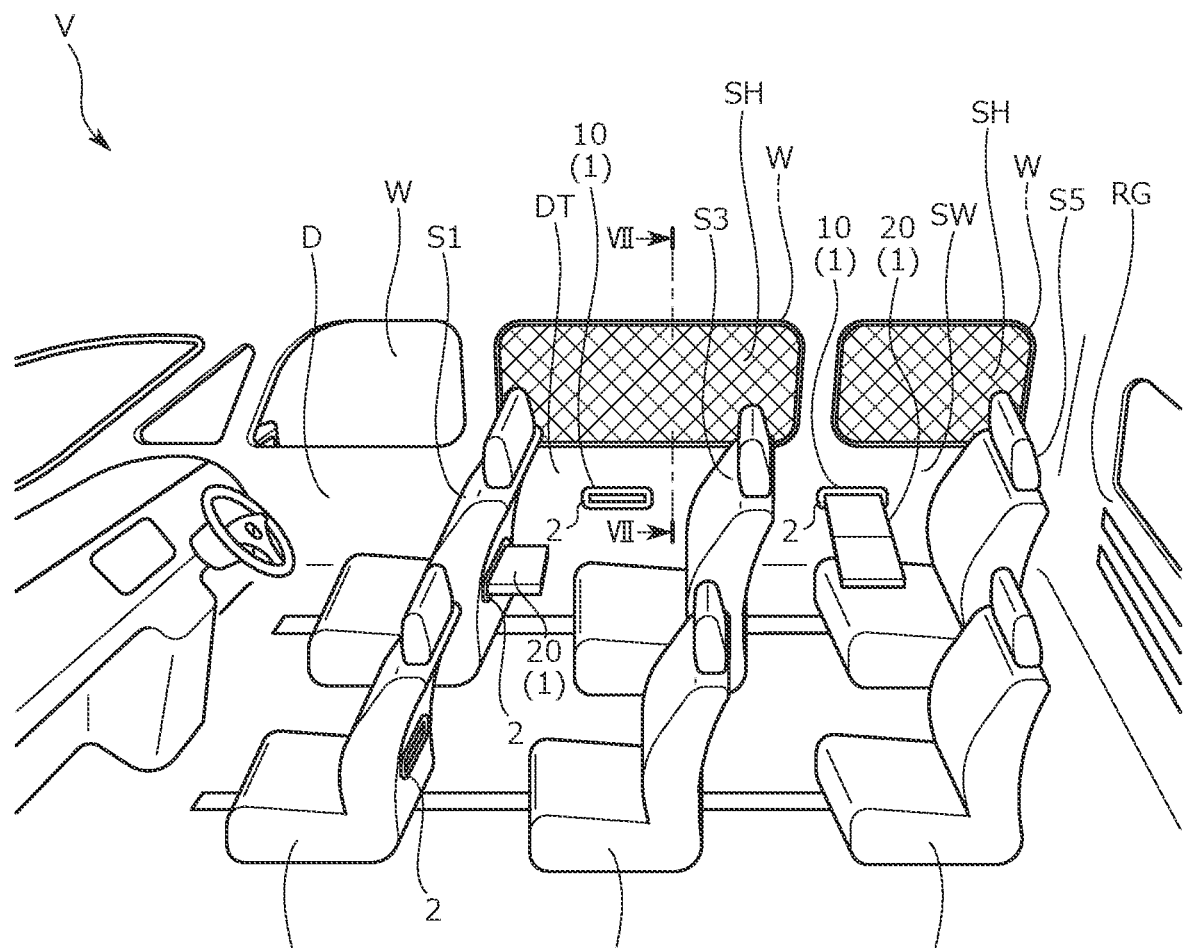
FIG. 1 is an explanatory view describing a vehicle provided with a functional component according to an embodiment.
Figure 1:
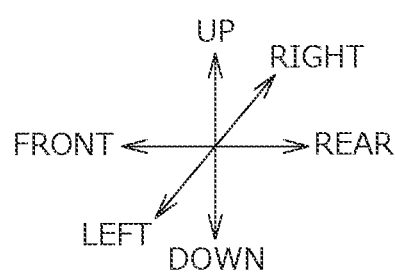
Figure 2:
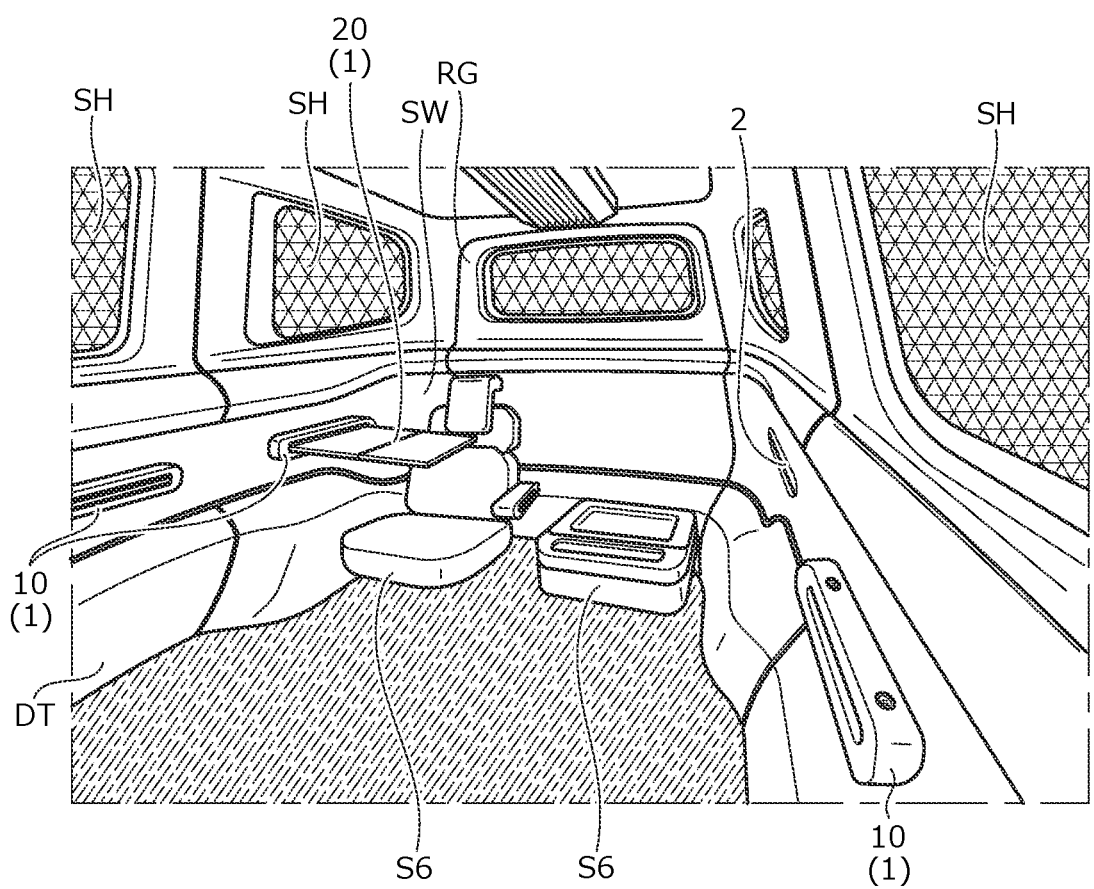
FIG. 2 is a view showing an interior of the vehicle, and is a view of a rear of a cabin when viewed from the front.

FIGS. 1 and 2 show an interior of the vehicle V including the attachment structure for a functional member according to the present invention. A vehicle door D of the vehicle V is provided with a window W and a shade device SH. In the interior of the vehicle V, a driver seat S1 and a passenger seat S2, middle seats S3 and S4 provided in a second row, and third seats S5 and S6 provided in a third row are provided in order from the front toward the rear of the vehicle V. Incidentally, hereinafter, unless otherwise particularly distinguished, the driver seat S1, the passenger seat S2, the middle seats S3 and S4, and the third seats S5 and S6 may be collectively referred to as the seat S. In addition, a rear gate RG is provided behind the third seats S5 and S6.

<Fitting Portion>

A plurality of fitting portions 2 for attaching functional components 1 are provided in the vehicle interior. As shown in FIG. 1, the fitting portions 2 are provided on back surfaces of the driver seat S1 and the passenger seat S2, on a door trim DT next to the middle seats S3 and S4, and on a side wall SW next to the third seats S5 and S6. An armrest 10 that is a first functional component is attachable to the fitting portion 2, and the fitting portion 2 is provided with a power supply mechanism 5 capable of supplying electric power to the attached armrest 10. Electric power is supplied by connecting the power supply mechanism 5 and a first power receiving unit 13 of the armrest 10.

As shown in FIG. 1, the armrest 10 is attached to the fitting portion 2 on the right side of the middle seat S3. In addition, another armrest 10 is attached to the fitting portion 2 on the right side of the third seat S5. A table device 20 that is the functional component 1 is further attached to the armrest 10 attached to the fitting portion 2 on the right side of the third seat S5. The table device 20 corresponds to a second functional component of the present invention.

Incidentally, the armrest 10 may not be attached to all the fitting portions 2 in the vehicle interior. In addition, the table device 20 may be attached to the fitting portion 2. For example, the table device 20 is directly attached to the fitting portion 2 on the back surface of the driver seat S1 in FIG. 1.

Each of the fitting portions 2 provided in the vehicle interior is formed in a predetermined groove shape. In addition, the armrest 10 to be attached to the fitting portion 2 is provided with a connection portion 11 having a protruding shape and fittable into the fitting portion 2 as will be described later, and is fittable into any of the fitting portions 2. Through standardizing the attachment structure for fitting the connection portion 11 into the fitting portion 2, a functional component other than the armrest 10, for example, the table device 20 is provided with the connection portion 11 having the same shape, so that the functional component having a different function is attachable.

Figure 3:
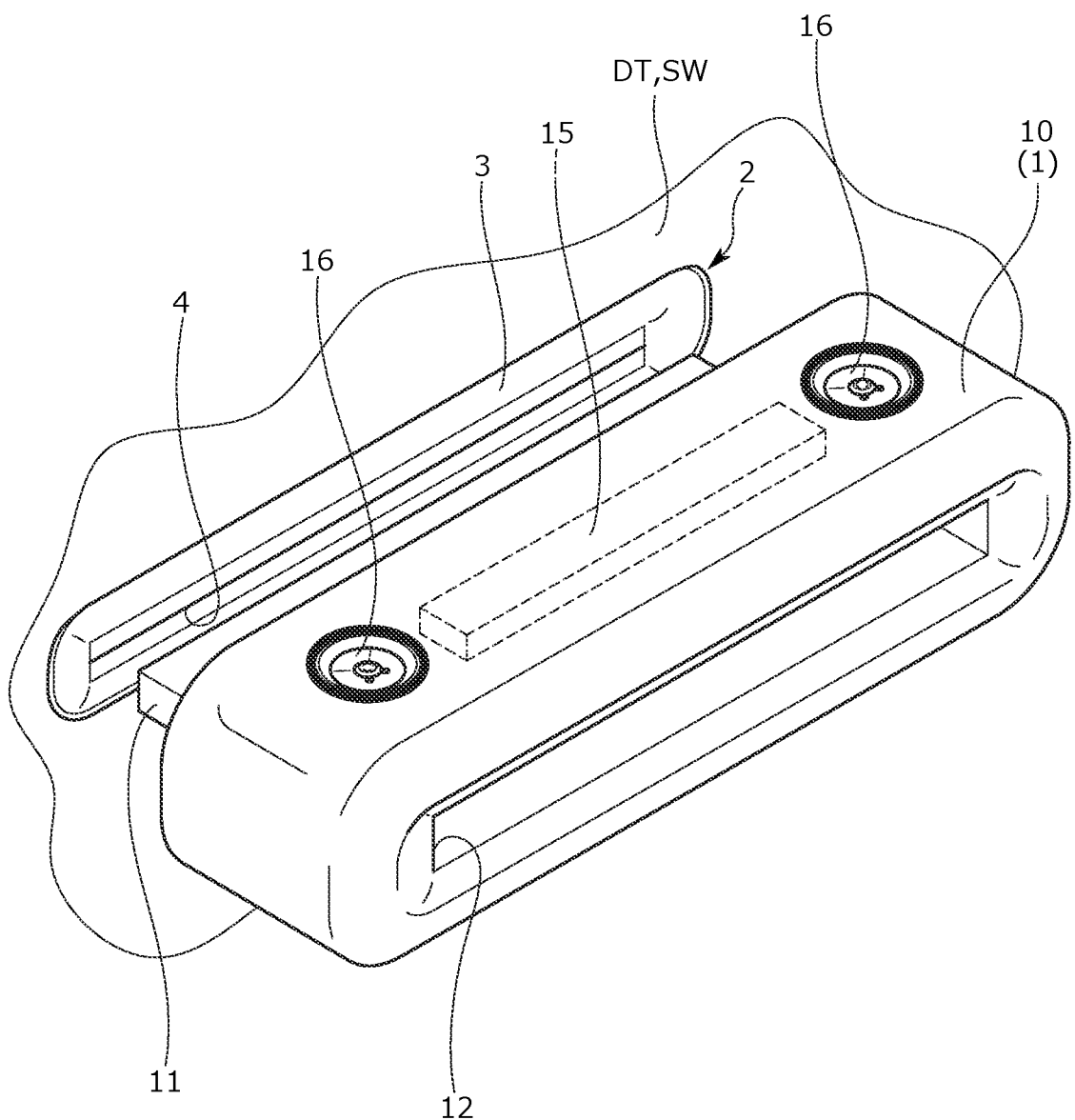
FIG. 3 is a perspective view showing an armrest that is a first functional component.

In addition, as shown in FIG. 3, the fitting portion 2 is provided inside a recess 3 recessed from the surface of the door trim DT or the side wall SW. Further, a flap 4 is provided around an opening of the recess 3. The flap 4 suppresses the intrusion of dust or debris into the inside of the fitting portion 2.

<First Functional Component>

The armrest 10 that is the first functional component will be described with reference to FIGS. 3 to 5B.

Figure 4:
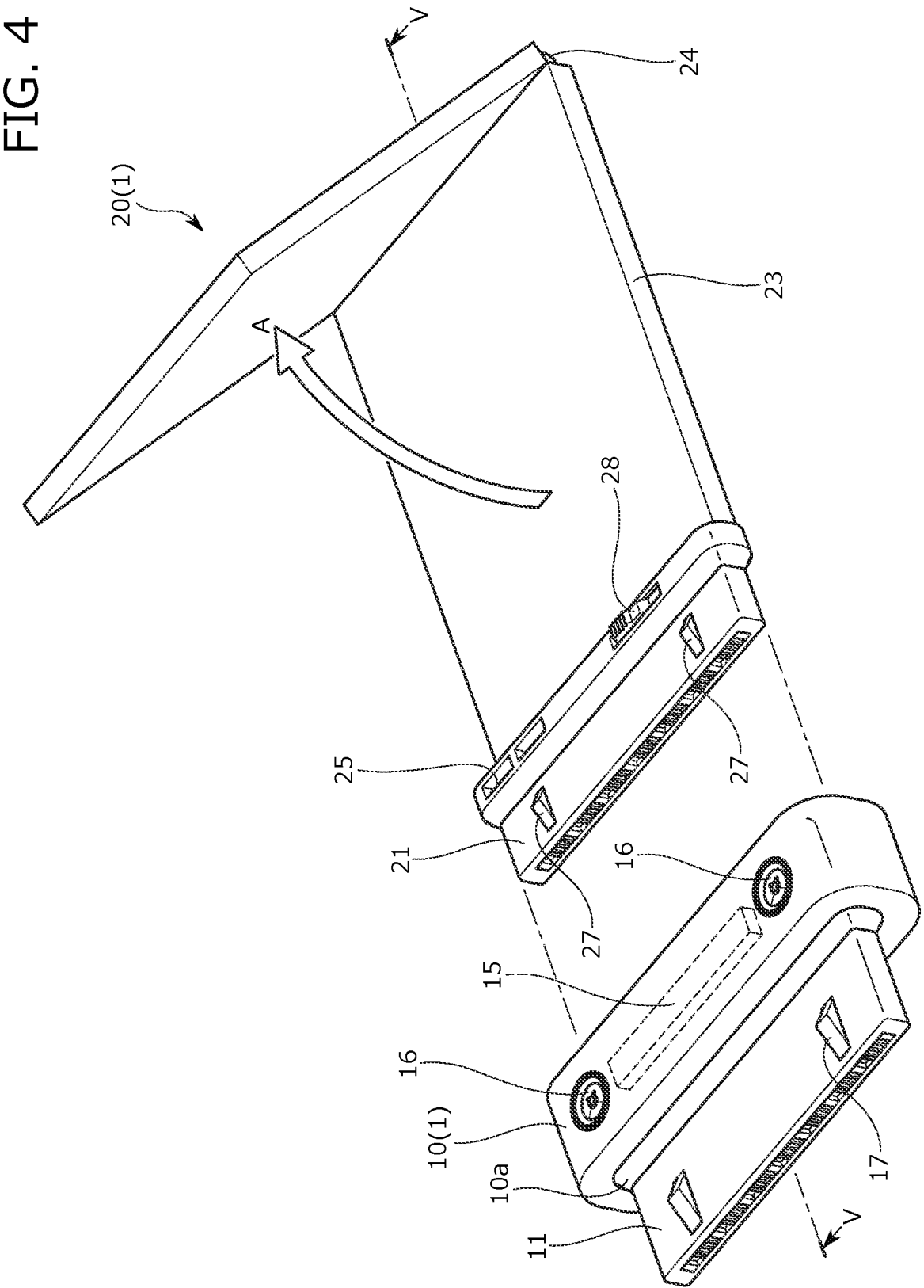
FIG. 4 is a perspective view showing the armrest and a table connected to the armrest.

The armrest 10 is a member attached to a vehicle body via the fitting portion 2 provided on the door trim DT or the side wall SW. The armrest 10 includes a base material 10a (refer to FIG. 5A) that is elongated, and a pad P and a skin T covering a periphery of the base material 10a. As described above, the armrest 10 includes the connection portion 11 inserted into the fitting portion 2. As shown in FIG. 4, the connection portion 11 extends from a side portion of the base material 10a. A latch 17 is provided at a tip of the connection portion 11, so that after the connection portion 11 is inserted into the fitting portion 2, the armrest 10 can be fixed to the fitting portion 2. In addition, as shown in FIG. 3, an opening portion 12 into which an insertion portion 21 of the table device 20 that is the second functional component is inserted is provided at a side portion on an opposite side of the connection portion 11.

The armrest 10 includes the first power receiving unit 13 at the connection portion 11, the first power receiving unit 13 receiving the supply of electric power from the fitting portion 2. In addition, the armrest 10 includes a power storage unit 15 that stores the supplied electric power. The armrest 10 includes a speaker 16. The speaker 16 can output sound by being connected to a smartphone or the like via a short-range wireless connection such as Bluetooth (registered trademark) or Wifi (registered trademark). The armrest 10 includes a power supply unit 14 that supplies electric power to the power storage unit 15 or the speaker 16. The power supply unit 14 can also supply electric power to the connected table device 20. In such a manner, the armrest 10 has a speaker function, but may be configured to include only the power storage unit 15 as a function when the speaker function is unnecessary. Since the power storage unit 15 is provided, even when electric power is not supplied from the vehicle V, electric power can be supplied to the table device 20 using the power storage unit 15.

The power supply unit 14 includes a first power supply circuit 14a that supplies electric power to the armrest 10, and a second power supply circuit 14b that supplies electric power to the table device 20, and can switch between the first power supply circuit 14a and the second power supply circuit 14b. The occupant can select whether to supply electric power to the armrest 10 or to the table device 20 as needed.

Figure 5B:
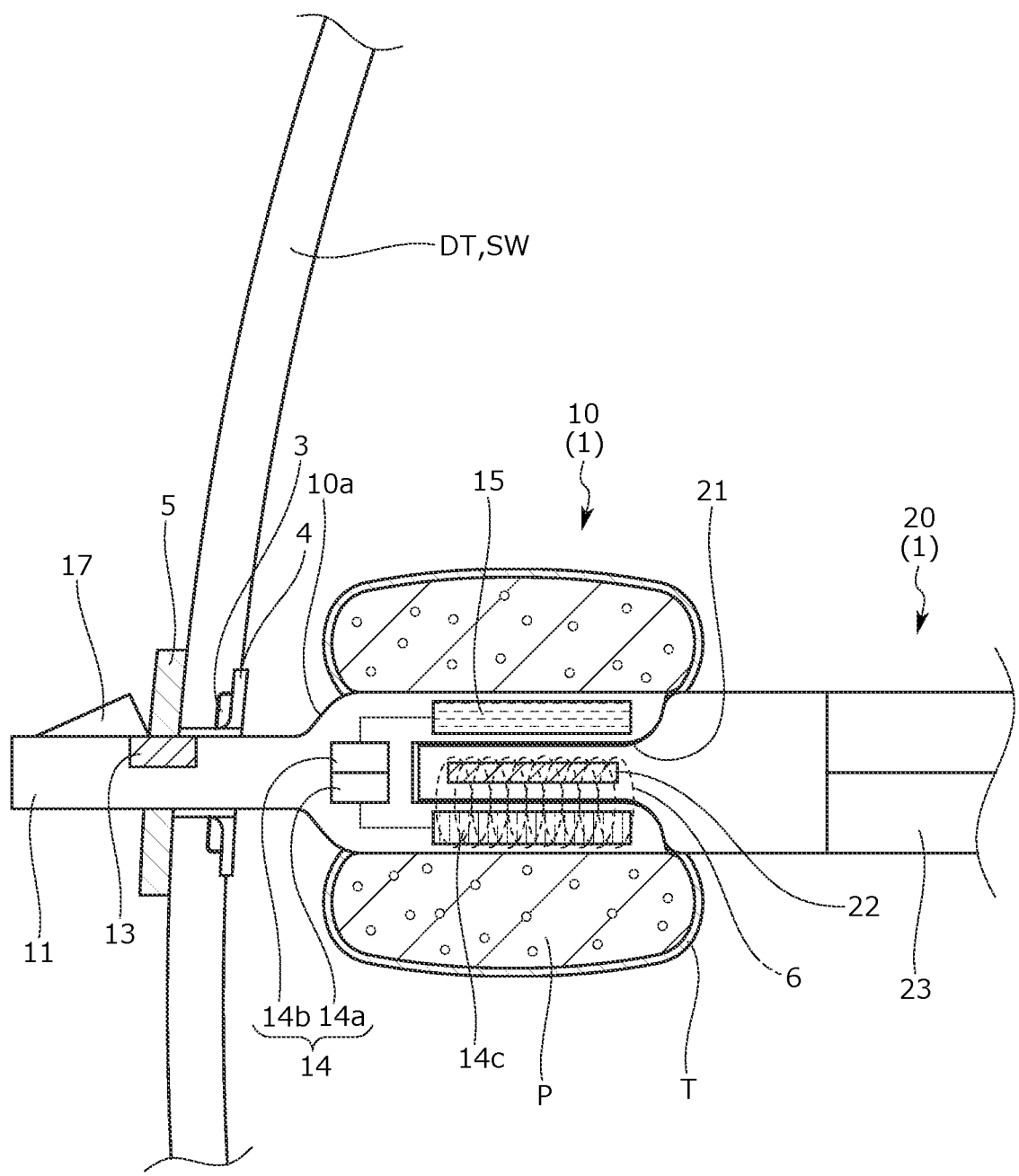
FIG. 5B is a view showing a state where the table is connected to the armrest.

In addition, the armrest 10 can supply electric power to the table device 20 via wireless power supply. Specifically, a power transmission coil 14c is provided at a lower portion of the opening portion 12. A power receiving coil 22 that is a second power receiving unit is provided in the insertion portion 21 of the table device 20. As shown in FIG. 5B, the power transmission coil 14c and the power receiving coil 22 are brought closer to each other by inserting the insertion portion 21 into the opening portion 12, and accordingly, a magnetic field 6 can be generated and electric power can be transmitted by wireless power supply.

By supplying electric power from the armrest 10 to the table device 20 via wireless power supply, waterproof and antifouling can be achieved without electrode terminals exposed.

<Second Functional Component>

Next, the table device 20 that is the second functional component will be described. The table device 20 is a device including a table portion 23 as shown in FIG. 5A, and is attached to the armrest 10 to function as a table. As shown in FIG. 5A, the table portion 23 can be deployed in the direction of arrow A by a hinge 24, so that the table area can be widened.

As described above, the table device 20 includes the insertion portion 21 inserted into the opening portion 12 of the armrest 10. As shown in FIGS. 5A and 5B, the power receiving coil 22 that is the second power receiving unit is provided inside the insertion portion 21, and can receive electric power from the power transmission coil 14c by inserting the insertion portion 21 into the opening portion 12.

The table device 20 is provided with a USB port 25 (one example of a power supply jack) capable of supplying electric power to, an external component, for example, a mobile phone, a smartphone, a music player, or the like. The occupant enables electric power to be supplied to an external component by connecting a USB terminal of a USB cable extending from the external component, to the USB port 25. The USB port 25 is one example, and may be a power supply tap.

The insertion portion 21 is provided with a latch 27, so that the table device 20 can be fixed by inserting the insertion portion 21 into the opening portion 12. In addition, a latch unlocking portion 28 for releasing the latch 27 is provided, and the occupant can remove the table device 20 from the armrest 10 by releasing the fixation of the latch 27.

Incidentally, the connection portion 11 of the armrest 10 and the insertion portion 21 of the table device 20 have the same size (the same standard), and the table device 20 can also be directly inserted and fixed to the fitting portion 2.

<Attachment of Vehicle Seat>

The armrest 10 is attached to the fitting portion 2 provided on the door trim DT or the side wall SW; however, this configuration is one example, and the armrest 10 may be attached to the vehicle seat S (conveyance seat). As shown in FIG. 1, the fitting portions 2 may be provided on the back surfaces of the driver seat S1 and the passenger seat S2, and the armrests 10 may be attached to the fitting portions 2.

Figure 6:
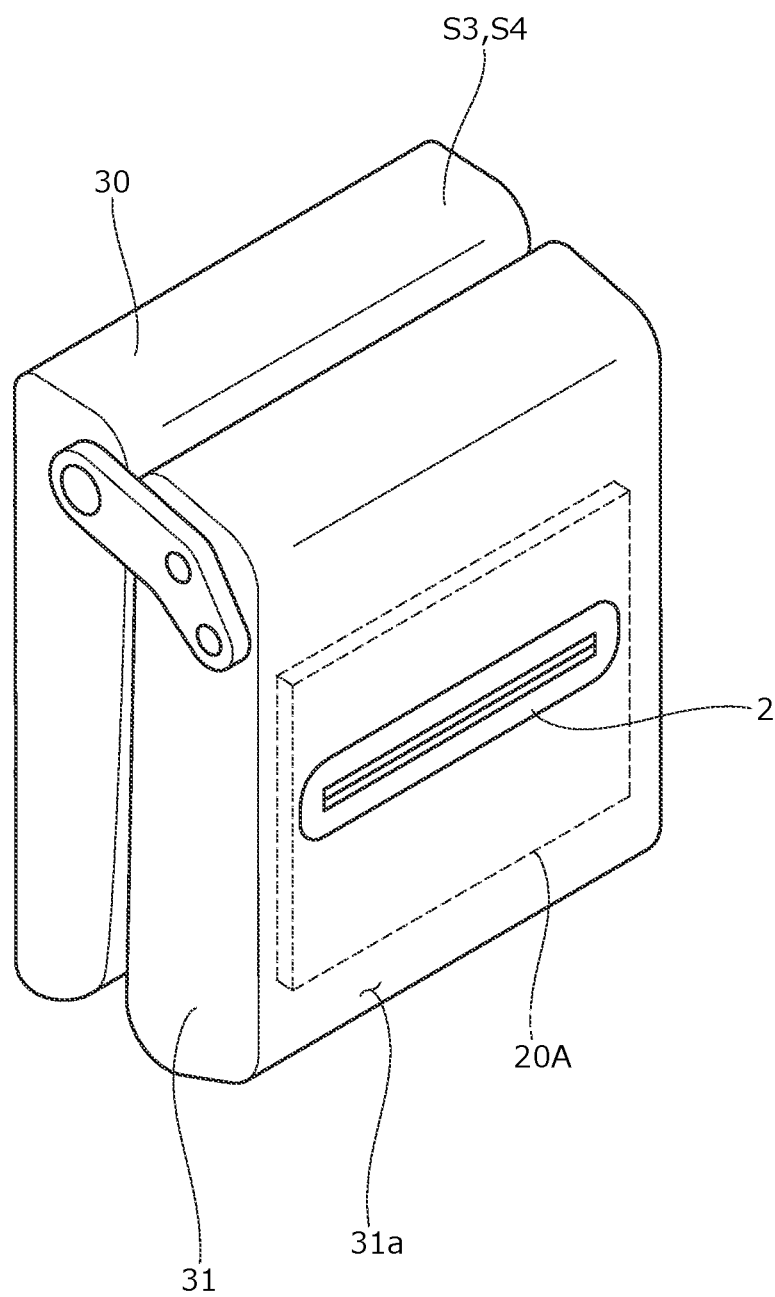
FIG. 6 is a perspective view showing the armrest provided on a seat in a folded state.

In addition, the middle seats S3 and S4 may be folded and the functional component 1 may be attached. The middle seats S3 and S4 are seats in which, as shown in FIG. 6, seat backs 30 can be reclined forward and then seat cushions 31 that are seating portions can be upright. When the seat cushions 31 of the middle seats S3 and S4 are upright, back surfaces 31a of the seat cushions 31 are exposed. As shown in FIG. 6, the fitting portions 2 capable of supplying electric power are provided on the back surfaces 31a. The table device 20 may be attached to the fitting portion 2 and may be used as a table. In addition, a monitor device 20A with an image display function may be attached as the second functional component.

The attachment structure for the functional component and the interior member that are the first embodiment of the present invention have been described above. The armrest 10, the table device 20, and the monitor device 20A have been described as examples of the functional component 1, but are one example, and for example, the functional component may be an illumination device or may be a cup holder with a heating and cooling function. In addition, the supply of electric power from the armrest 10 to the table device 20 is performed via wireless power supply; however, electric power may be supplied by bringing electrodes into direct contact with each other.

Second Embodiment

A configuration of a shade device for a conveyance that is a second embodiment of the present invention will be described.

The second embodiment relates to a shade device for a conveyance, particularly to a shade device for a conveyance provided on a window of the conveyance.

JP 2008-184106 A discloses a shade formed with a light-shielding rate of 50% to 70%.

However, in recent years, vehicle interiors have come to be used for various applications and purposes, and when it is desired to ensure shielding from the outside, it is desirable that the light-shielding rate is further increased by decreasing the transmittance of a shade. On the other hand, there is also a demand to increase the transmittance during driving, and a shade capable of adjusting the light-shielding rate has been desired.

Technical Problem

A shade device for a conveyance according to the second embodiment has been made in view of the foregoing problems, and an object of the second embodiment is to provide a shade device for a conveyance capable of adjusting the light-shielding rate (transmittance).

Solution to Problem

The foregoing problems are solved by a shade device for a conveyance according to the second embodiment including: a first light-shielding component provided on an interior side of a window glass of the conveyance; and a second light-shielding component provided at a predetermined distance from the first light-shielding component, and having a transmittance different from a transmittance of the first light-shielding component.

Since the first light-shielding component and the second light-shielding component having a different transmittance are provided with a distance therebetween, the transmittance can be adjusted. For example, the transmittance can be adjusted by replacing the second light-shielding component. The light-shielding rate can also be adjusted by changing the transmittance, so that the shade device for a conveyance capable of adjusting the light-shielding rate can be provided.

In addition, according to the shade device for a conveyance, the first light-shielding component may be formed to depict a predetermined pattern on the interior side of the window glass.

By depicting the predetermined pattern on the interior side of the window glass, decorativeness can be enhanced and an ambiance through the pattern can be created.

In addition, according to the shade device for a conveyance, the second light-shielding component may be a shade provided on the interior side of the window glass, and may be movable in an up to down direction.

The transmittance can be more easily adjusted by enabling the second light-shielding component having the transmittance different from that of the first light-shielding component, to be moved in the up to down direction.

In addition, according to the shade device for a conveyance, the second light-shielding component may be formed such that the transmittance changes from a top toward a bottom.

For example, a boundary between the second light-shielding component and the window glass is made natural by changing the transmittance of the second light-shielding component in the up to down direction, so that the appearance can be improved.

In addition, according to the shade device for a conveyance, the second light-shielding component may be formed such that the transmittance decreases from a top toward a bottom.

By decreasing the transmittance toward a lower side, namely, increasing the light-shielding rate, it is made difficult for an occupant to see the outside of a vehicle from the line of his or her sight, so that light can be taken in without worrying about the lines of sight from the outside of the vehicle.

According to the shade device for a conveyance that is the second embodiment, the transmittance can be adjusted by providing the first light-shielding component and the second light-shielding component having a different transmittance with a distance therebetween. For example, the transmittance can be adjusted by replacing the second light-shielding component. The light-shielding rate can also be adjusted by changing the transmittance, so that the shade device for a conveyance capable of adjusting the light-shielding rate can be provided.

In addition, by depicting the predetermined pattern on the interior side of the window glass, decorativeness can be enhanced and an ambiance through the pattern can be created.

In addition, the transmittance can be more easily adjusted by enabling the second light-shielding component to be moved in the up to down direction.

For example, the boundary between the second light-shielding component and the window glass is made natural by changing the transmittance of the second light-shielding component in the up to down direction, so that the appearance can be improved.

In addition, by decreasing the transmittance toward the lower side, namely, increasing the light-shielding rate, it is made difficult for the occupant to see the outside of the vehicle from the line of his or her sight, so that light can be taken in without worrying about the lines of sight from the outside of the vehicle.

A shade device according to a second embodiment of the present invention will be described with reference to the drawings.

However, the embodiment to be described below is provided to facilitate understanding of the present invention, and does not limit the present invention. Namely, the present invention can be modified and improved without departing from the concept of the present invention, and it goes without saying that the present invention includes equivalents of the present invention.

In addition, in the following description, the contents relating to the materials, shapes, and sizes of components constituting a shade device for a conveyance are provided as merely one specific example, and do not limit the present invention.

Incidentally, hereinafter, a shade device provided in a conveyance automobile (vehicle V) such as a minivan will be described as one example of the shade device for a conveyance. However, the present invention is not limited to shade devices for vehicles mounted in ground traveling conveyances including wheels, such as an automobile and a train, and can also be applied to, for example, shade devices mounted in an aircraft, a ship, or the like moving in environments other than the ground.

In addition, in the following description, a "front to rear direction" is a front to rear direction of the vehicle V, and is a direction coinciding with a forward movement direction of the vehicle when traveling. In addition, a "width direction" is a lateral width direction of the vehicle V, and is a direction coinciding with a right to left direction when viewed from an occupant seated in a vehicle seat S. In addition, an "up to down direction" is an up to down direction of the vehicle V, and is a direction coinciding with a vertical direction when the vehicle V travels on a horizontal surface. In addition, an "outer side" being simply referred to indicates a side closer to the outside in a direction from a center of the vehicle toward the outside, and an "inner side" being referred to means a side closer to the center in a direction from the outside of the vehicle V toward the center. In addition, an "interior side" means a direction toward a vehicle interior.

FIGS. 1 and 2 show an interior of the vehicle V including a shade device SH that is the second embodiment. The shade device SH is provided to overlap a window W of the vehicle V. In the interior of the vehicle V, a driver seat S1 and a passenger seat S2, middle seats S3 and S4 provided in a second row, and third seats S5 and S6 provided in a third row are provided in order from the front toward the rear of the vehicle V. Incidentally, hereinafter, unless otherwise particularly distinguished, the driver seat S1, the passenger seat S2, the middle seats S3 and S4, and the third seats S5 and S6 may be collectively referred to as the seat S. In addition, a rear gate RG is provided behind the third seats S5 and S6.

Figure 7:
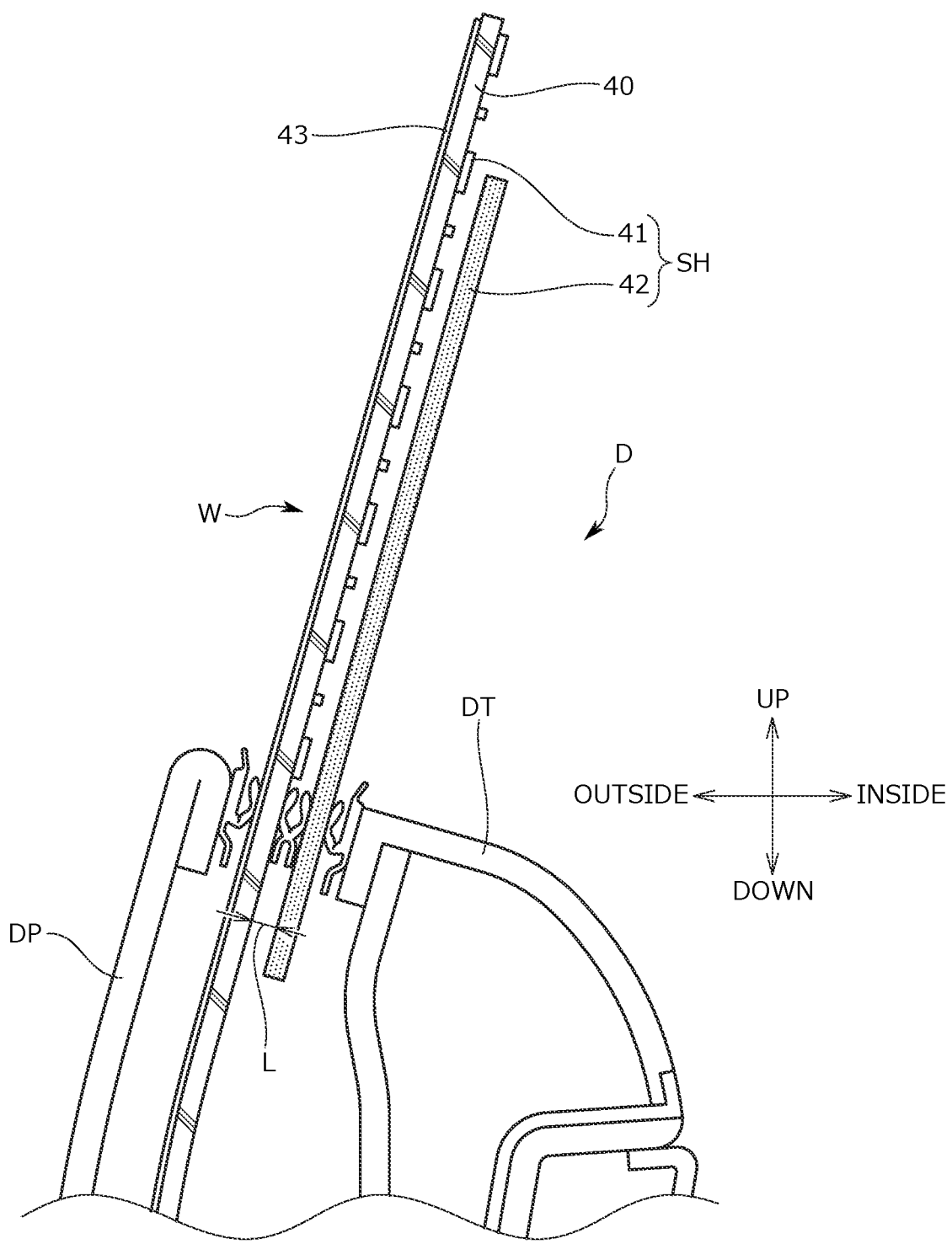
FIG. 7 is a cross-sectional view of a window taken along line VII-VII of FIG. 1.

The shade device SH includes a first light-shielding component 41 and a second light-shielding component 42. As shown in FIG. 7, the first light-shielding component 41 is provided on an inner surface side of an interior side of a window glass 40 of a vehicle door D of the vehicle V. In addition, the second light-shielding component 42 is provided at a predetermined distance L from the first light-shielding component 41. In addition, as shown in FIG. 7, the window glass 40, the first light-shielding component 41, and the second light-shielding component 42 are provided between a door panel DP and a door trim DT. The window glass 40, the first light-shielding component 41, and the second light-shielding component 42 may be provided between the door panel DP and a side wall SW.

The first light-shielding component 41 and the second light-shielding component 42 are formed with predetermined transmittances T1 and T2. The transmittance T1 of the first light-shielding component 41 and the transmittance T2 of the second light-shielding component 42 are set to be different from each other.

In the present embodiment, as the first light-shielding component 41, an opaque sheet is affixed to the interior surface side of the window glass 40 in a predetermined pattern. In addition, the second light-shielding component 42 is realized by opening a plurality of openings 42a in a wooden plate (refer to FIG. 8).

Incidentally, this configuration is one example, and for example, a translucent sheet, an opaque sheet, a mesh sheet, a woven fabric, and the like can be adopted as the first light-shielding component 41 and the second light-shielding component 42. In addition, synthetic resins such as polyvinyl chloride resin and polypropylene resin may be used.

In addition, the first light-shielding component 41 is formed to depict a predetermined pattern on the interior side of the window glass 40. An example of the predetermined pattern is a louver pattern. The pattern may be a polka-dot pattern, a stripe pattern, a mesh pattern, a checkered pattern, and the like, and the second light-shielding component 42 overlaps the pattern, so that an overall transmittance T can be adjusted and an interior space can be created through the pattern.

As the window glass 40 moves up and down, the first light-shielding component 41 is movable in accordance with the movement. In addition, the second light-shielding component 42 is also configured to be movable up and down. The up and down movement of the second light-shielding component 42 may be manually performed by the occupant. In addition, the up and down movement of the second light-shielding component 42 may be performed, for example, by a drive device provided inside the door. As the second light-shielding component 42 moves up and down, the transmittance T changes between an overlapping portion and a non-overlapping portion with the first light-shielding component 41, so that the overall transmittance T of the shade device SH can be adjusted. The light-shielding rate is changeable by adjusting the transmittance T.

Figure 8:
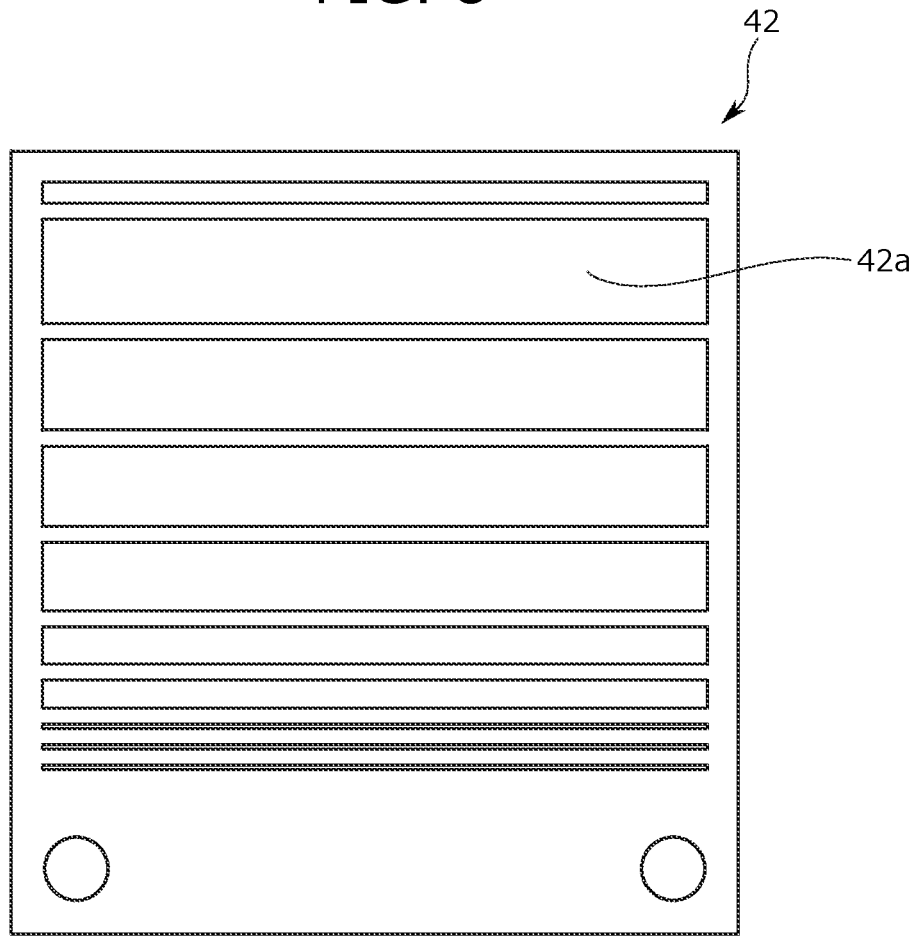
FIG. 8 is a side view of a second light-shielding component when viewed from the inside of the vehicle.
Figure 8:
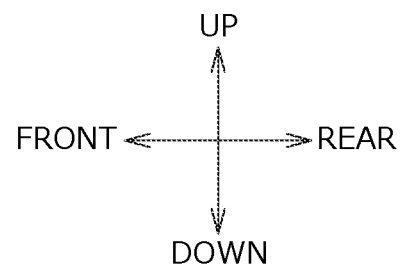

FIG. 8 shows a side view of the second light-shielding component 42. The openings 42a having different sizes are formed in the second light-shielding component 42, and are formed such that the transmittance changes from the top toward the bottom. The second light-shielding component 42 shown in FIG. 8 is provided with the openings 42a that are increased in area as the openings 42a are located closer to the top, and is formed such that the transmittance T2 decreases from the top toward the bottom, namely, the light-shielding rate increases.

A boundary portion between the second light-shielding component 42 and the window glass 40 can be made natural by increasing the transmittance of an upper portion of the second light-shielding component 42. In addition, by decreasing the transmittance T2 (increasing the light-shielding rate) toward a lower side, it is made difficult for the occupant to see the outside of the vehicle from the line of his or her sight, so that light can be taken in without worrying about the lines of sight from the outside of the vehicle.

Incidentally, a heat-insulating film 43 such as silver or a half mirror may be affixed to an outer surface of the window glass 40. The window glass 40 is blindfolded, and heat insulation can be improved.

The shade device SH for a vehicle that is the second embodiment of the present invention has been described above with reference to the drawings. The shade device SH is applied to the vehicle door; however, this application is one example, and the shade device SH may be applied to a sunroof.

Third Embodiment

An interior structure for a vehicle that is a third embodiment of the present invention will be described.

JP 2017-114382 A discloses a structure in which an operating switch that is a capacitive sensor for operating vehicle functions is provided on an interior member such as a door armrest of a vehicle. However, in the structure in which the operating switch is provided at a predetermined position on the interior member, the operating switch is distant from an occupant depending on the seating position of the occupant, and becomes difficult to operate, which is a problem.

Technical Problem

An interior structure for a vehicle that is the third embodiment has been made in view of the foregoing problem, and an object of the third embodiment is to provide an interior structure for a vehicle in which an operating unit is disposed at an appropriate position regardless of the seating position of an occupant.

Solution to Problem

The foregoing problem is solved by an interior structure for a vehicle according to the third embodiment including: an interior member including touch panels that receive a touch operation of an occupant. The touch panels include display units capable of displaying operating units corresponding to a predetermined function of the vehicle, at predetermined positions. The operating units are controlled in position within the display units according to a position of a seat provided in a vehicle interior.

In addition, in the interior structure for a vehicle, the seat is switchable in a stepped or stepless manner between at least a normal seating position and a position lower than the normal seating position, and the display units of the touch panels can display the operating units at least at an upper end portion and a lower end portion of the interior member. Incidentally, the display units provided at the upper end portion and the lower end portion may be integrally provided or may be separately provided.

In the normal seating position, the operating unit is displayed at the upper end portion of the interior member. In addition, in a seating position lower than the normal seating position, the operating unit is displayed at the lower end portion of the interior member.

Advantageous Effects of Invention

According to the interior structure for a vehicle that is the third embodiment, the display position of the operating unit is changeable according to the seating position of the seat, and the operating unit is disposed at an appropriate position regardless of the seating position of the occupant.

Specific Example

Figure 9:
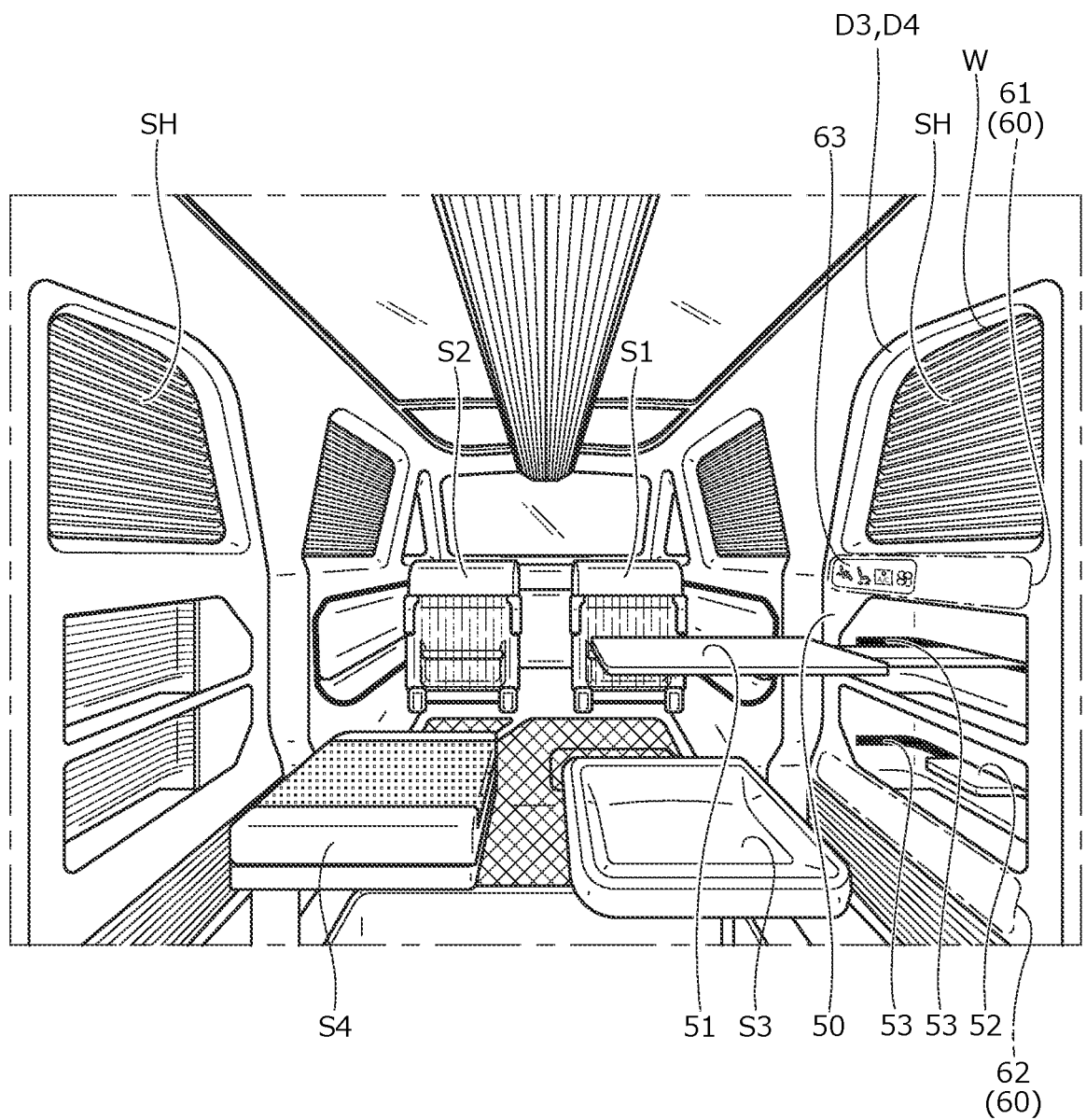
FIG. 9 is a view showing the cabin in a work mode, and is a view of the cabin when viewed from the rear.
Figure 10:
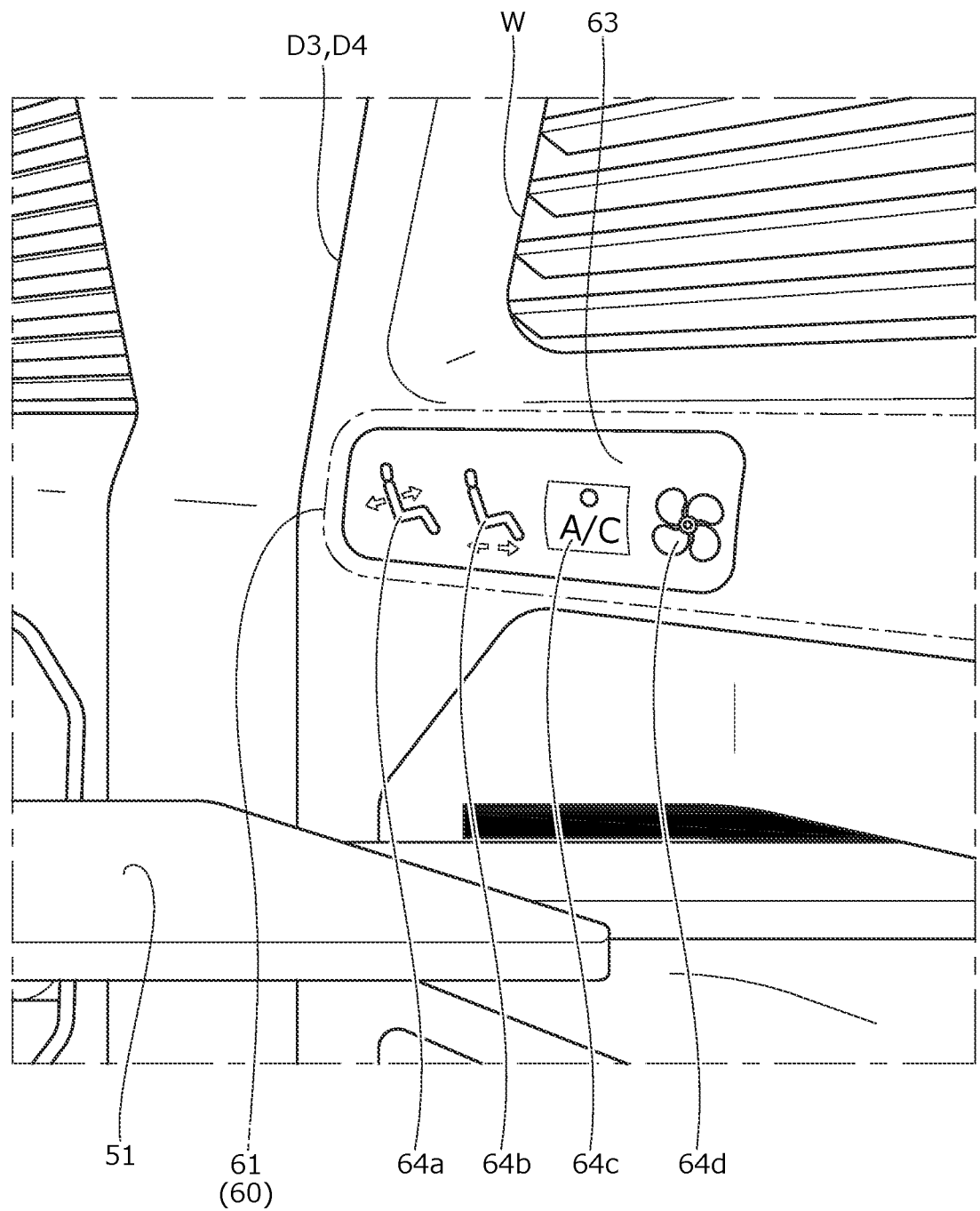
FIG. 10 is a view showing an operating unit displayed at an upper end portion of a door.
Figure 11:
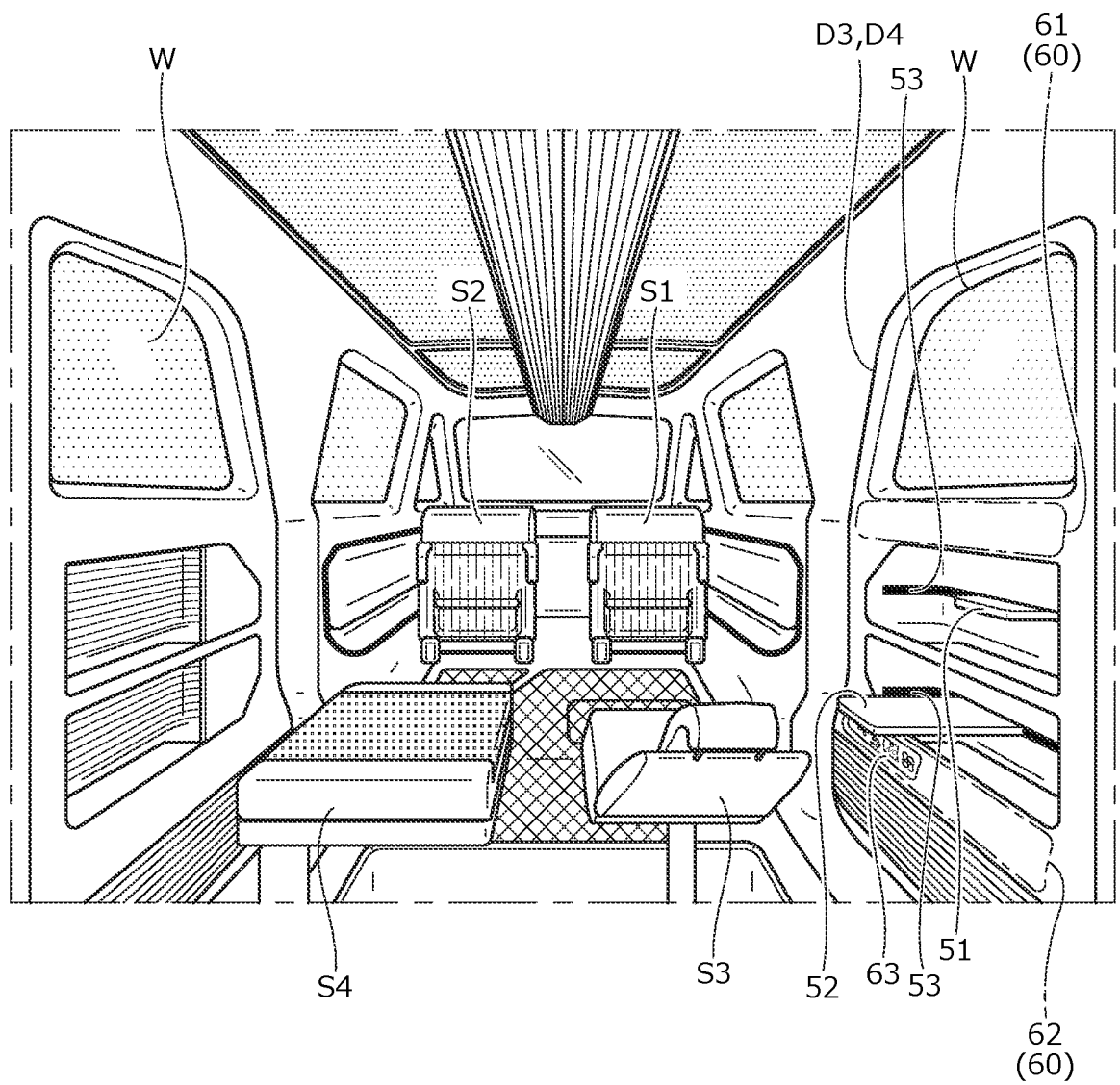
FIG. 11 is a view showing the cabin in a relaxation mode, and is a view of the cabin when viewed from the rear.
Figure 12:
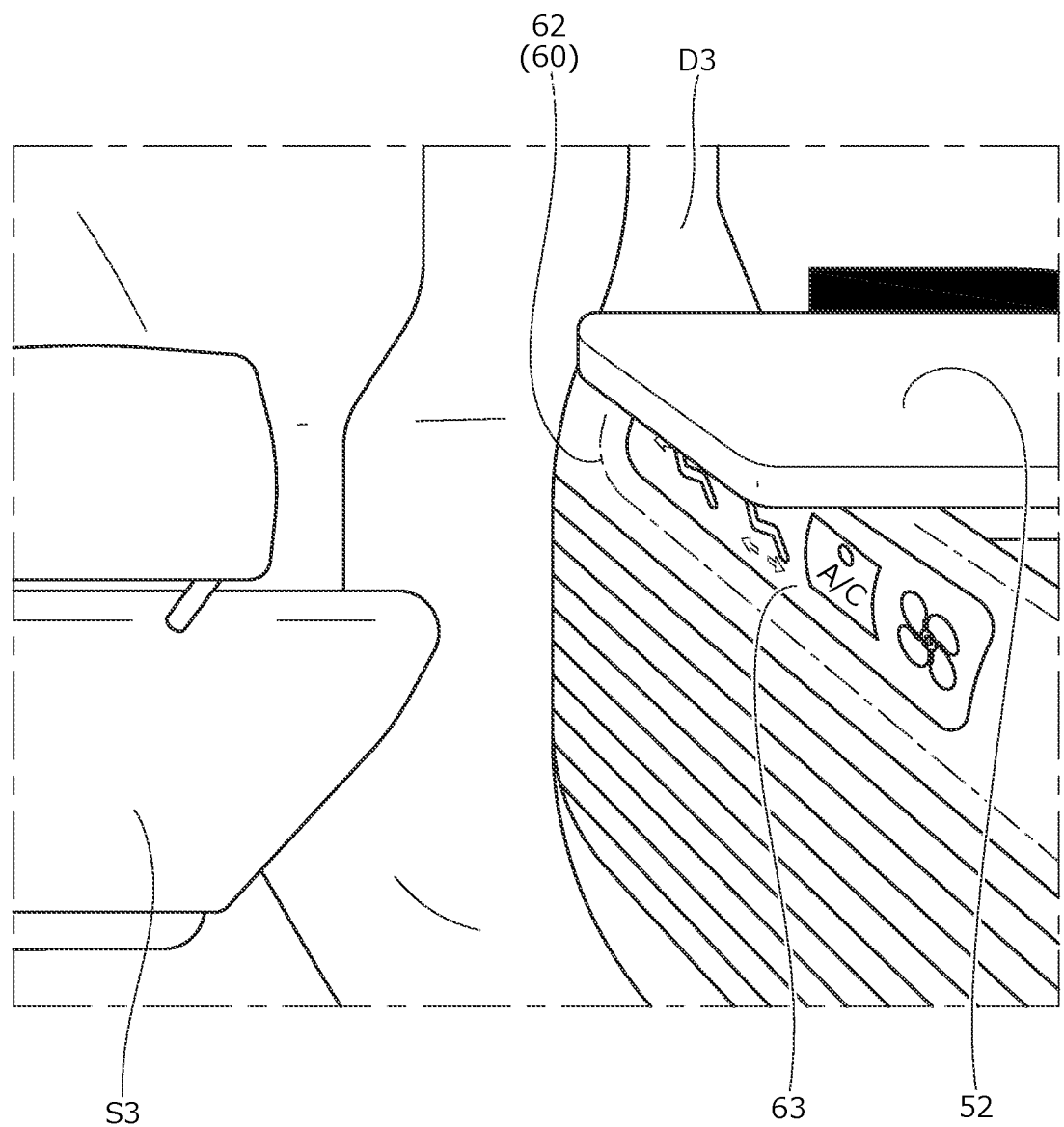
FIG. 12 is a view showing the operating unit displayed at a lower end portion of the door.

A specific example of the third embodiment will be described with reference to FIGS. 9 to 12. FIG. 9 is a view showing the cabin in a work mode, and is a view of the cabin when viewed from the rear. FIG. 10 is a view showing an operating unit 63 displayed at an upper end portion of a door D3 in a work mode. FIG. 11 is a view showing a state of the cabin in a relaxation mode. FIG. 12 is a view showing the operating unit 63 displayed at a lower end portion of the door D3 in a relaxation mode.

The cabin in a work mode will be described with reference to FIG. 9. An upper table 51 extends on a cantilever beam from the door D3 on the right side toward the vehicle interior. An occupant can be seated in the middle seat S4 that is a vehicle seat on the left side, and can work or study. At this time, the middle seat S3 on the right side is flattened, and luggage or the like can be placed thereon.

A touch panel 60 (display unit) is provided at an upper end portion and a lower end portion of a door lining 50 (one example of an interior member) provided on the door D3 on the right side, and the operating unit 63 is displayed at an appropriate position within the touch panel 60 according to the state of the vehicle seat. The touch panel 60 includes an upper touch panel 61 provided at the upper end portion of the door lining 50, and a lower touch panel 62 provided at the lower end portion of the door lining 50. The touch panel 60 is, for example, a capacitive sensor type switch, and the occupant can cause a signal to be transmitted to an ECU provided in a vehicle by touching the touch panel 60. In addition, the touch panel 60 is also a touch panel display, and a liquid crystal monitor (display unit) is provided behind a capacitive sensor. Which portion is operable when touched can be indicated by displaying icons on the liquid crystal monitor.

The operating units 63 can be displayed on both the upper touch panel 61 and the lower touch panel 62. In addition, the display position of the operating unit 63 is changeable in a stepless manner in the front to rear direction. The operating unit 63 includes switches 64 for operating various functions provided in the vehicle, and is configured to enable the occupant to understand the function of each of the switches 64 by displaying icons. For example, a switch 64a can be used to operate a reclining function of the vehicle seat, and enables the adjustment of the inclination angle of the back seat when touched. A switch 64b can be used to operate a slide function of the vehicle seat, and enables the seat to be slid in the front to rear direction when touched. A switch 64c can be used to operate an air conditioner, and a switch 64d can be used to operate the air volume or the like. Incidentally, the number of the switches 64 displayed on the operating unit 63 is not limited to four, and may be five or more or three or less. In addition, the operable functions may be not only the operation of the vehicle seat or the air conditioner, but also, for example, an illumination device, the opening and closing of a window, a door locking function, or the like.

The operating unit 63 is changeable in display position within the touch panel 60 according to the height of the vehicle seat. Specifically, in the work mode, when the occupant works on the upper table 51 in a state where the occupant is seated in the middle seat S4 on the left side, the operating unit 63 is displayed at the upper end portion of the door lining 50 which is a position where the occupant can reach out and operate the operating unit 63. Incidentally, the operating unit 63 is displayed at the upper end portion of the door lining 50 not only in the work mode but also during normal traveling, so that the seated occupant can easily use the operating unit.

In a relaxation mode, as shown in FIG. 11, the middle seat S3 on the right side is in a reclined state. In this case, as shown in FIGS. 11 and 12, the operating unit 63 is displayed at the lower end portion (lower touch panel 62) of the door lining 50. The position of the operating unit 63 is located below a lower table 52, and the occupant can use the operating unit 63 in a relaxed state without raising his or her body.

Fourth Embodiment

An interior structure for a vehicle that is a fourth embodiment of the present invention will be described.

JP 2017-114382 A discloses a structure in which an operating switch that is a capacitive sensor for operating vehicle functions is provided on an interior member such as a door armrest of a vehicle. On the other hand, the interior member of the vehicle may be such that an attachment such as a table is provided on the surface of the interior member. In this case, as disclosed in JP 2017-114382 A, in the structure in which the operating switch is provided at a predetermined position on the interior member, the operating switch is distant from an occupant depending on the seating position of the occupant, and becomes difficult to operate, which is a problem.

Technical Problem

An interior structure for a vehicle that is the fourth embodiment has been made in view of the foregoing problem, and an object of the fourth embodiment is to provide an interior structure for a vehicle in which a display position of an operating unit is changeable according to an attachment and the operating unit is appropriately operable without being obstructed by the attachment.

Solution to Problem

The foregoing problem is solved by an interior structure for a vehicle according to the fourth embodiment including: an interior member including touch panels that receive a touch operation of an occupant. The touch panels include display units capable of displaying operating units corresponding to a predetermined function of the vehicle, at predetermined positions. The interior member includes attachment portions to which an attachment is attachable. Display positions of the operating units are controlled in conjunction with a presence or absence of the attachment or the attached attachment.

The attachment may be a flat plate-shaped table, and when the table is inserted into the attachment, the operating unit may be displayed at a position that is not hidden by the table.

In addition, the seat may be switchable in a stepped or stepless manner between at least a normal seating position and a position lower than the normal seating position. The display units of the touch panels may be able to display the operating units at least at an upper end portion and a lower end portion of the interior member. When the table is attached in a case where the seat is in the seating position lower than the normal seating position, the operating unit may be displayed below the table.

In addition, the attachment may include a battery, and the display unit may be configured to be able to display a remaining battery capacity of the attachment.

Advantageous Effects of Invention

According to the fourth embodiment, it is possible to provide the interior structure for a vehicle in which the display position of the operating unit is changeable according to the attachment and the operating unit is appropriately operable without being obstructed by the attachment.

Specific Example

A specific example of the fourth embodiment will be described with reference to FIGS. 9 to 12. A door D4 used in a vehicle interior structure of the fourth embodiment is provided with the upper table 51 and the lower table 52 extending from the door lining 50 toward a vehicle interior.

In the work mode, the upper table 51 is configured to extend as shown in FIG. 9, and in the relaxation mode, the lower table 52 is configured to extend as shown in FIG. 10. On the door lining 50, similarly to the third embodiment, the operating unit 63 is displayed by the touch panel 60. Since the configurations of the touch panel 60 and the operating unit 63 are same as those of the third embodiment, the detailed description thereof will be omitted.

The door lining 50 is provided with attachment portions 53 to which the upper table 51 and the lower table 52 are attached. In the fourth embodiment, the operating units 63 are configured such that the display positions of the operating units 63 are controlled in conjunction with the position where an attachment is attached to one of the attachment portions 53 provided on the door lining 50.

As shown in FIG. 9, when the upper table 51 is attached to the attachment portion 53 on the upper side, the operating unit 63 is displayed on the upper touch panel 61. In addition, when the lower table 52 is attached to the attachment portion 53 on the lower side, the operating unit 63 is displayed on the lower touch panel 62. In this case, when the operating unit 63 is displayed below the lower table 52, an occupant seated in the middle seat S3 in a reclined state easily operates the operating unit 63 since the operating unit 63 is not obstructed by the lower table 52.

Incidentally, batteries may be mounted in the upper table 51 and the lower table 52, and it is convenient if a remaining battery capacity is displayed on the touch panel 60.

Fifth Embodiment

An interior structure for a vehicle that is a fifth embodiment of the present invention will be described.

JP 2017-114382 A discloses a structure in which an operating switch that is a capacitive sensor for operating vehicle functions is provided on an interior member such as a door armrest of a vehicle. On the other hand, particularly in a passenger vehicle or a shared car, there is a possibility that many unspecified occupants touch an operating switch, and it is desirable that such an operating switch is properly cleaned.

Technical Problem

An interior structure for a vehicle that is the fifth embodiment has been made in view of the foregoing problems, and an object of the fifth embodiment is to provide an interior structure for a vehicle in which it is recognized that a display unit is touched by an occupant and it is apparent whether or not cleaning is necessary and where to clean.

Solution to Problem

The foregoing problems are solved by an interior structure for a vehicle according to the fifth embodiment including: an interior member including a touch panel that receives a touch operation of an occupant. The touch panel includes a display unit capable of displaying an operating unit corresponding to a predetermined function of the vehicle, at a predetermined position. The display unit is controlled to change a color of the display unit for a certain time after the display unit is touched by the occupant.

In addition, the display unit may be controlled to change the color when the display unit is cleaned.

In addition, the operating unit may be displayed within the display unit at a position where the operating unit is not touched by the occupant.

Advantageous Effects of Invention

According to the fifth embodiment, it is possible to provide the interior structure for a vehicle in which by changing the color of the display unit, it is recognized that the display unit is touched by the occupant and it is apparent whether or not cleaning is necessary and where to clean.

Specific Example

Figure 13:
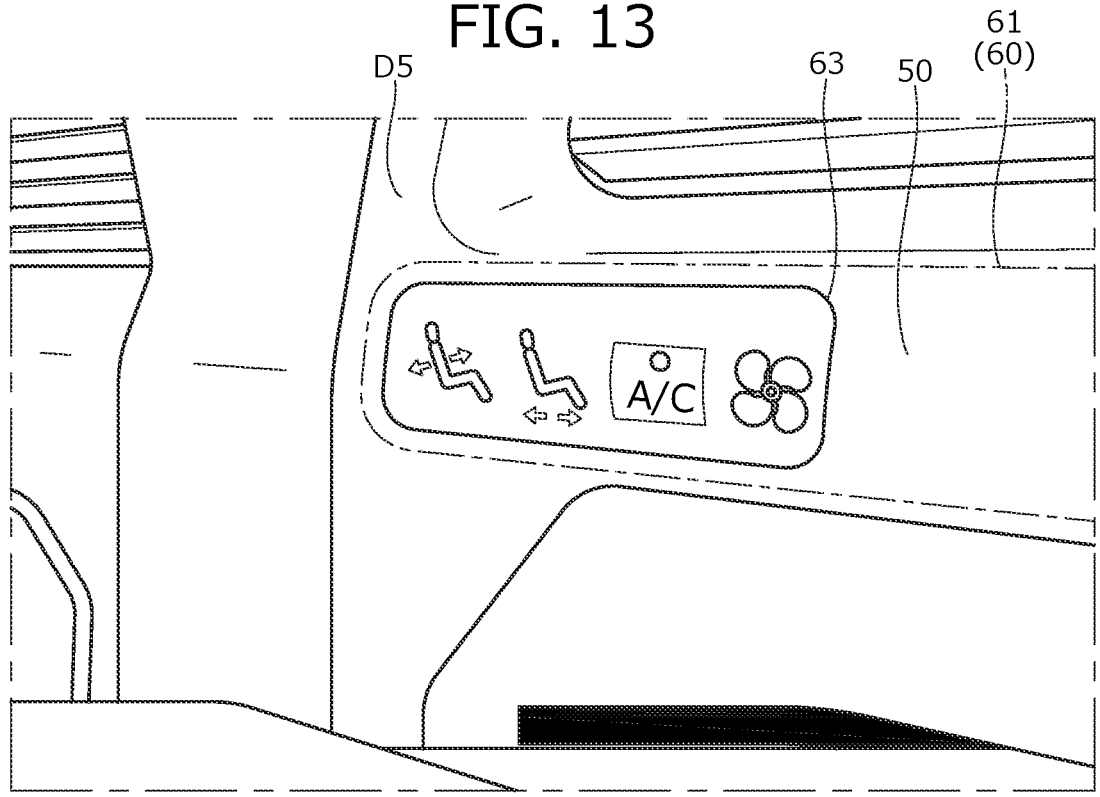
FIG. 13 is a view showing the operating unit before and after being touched by an occupant, the upper part is a view of the operating unit before being touched, and the lower part is a view of the operating unit after being touched.
Figure 13:
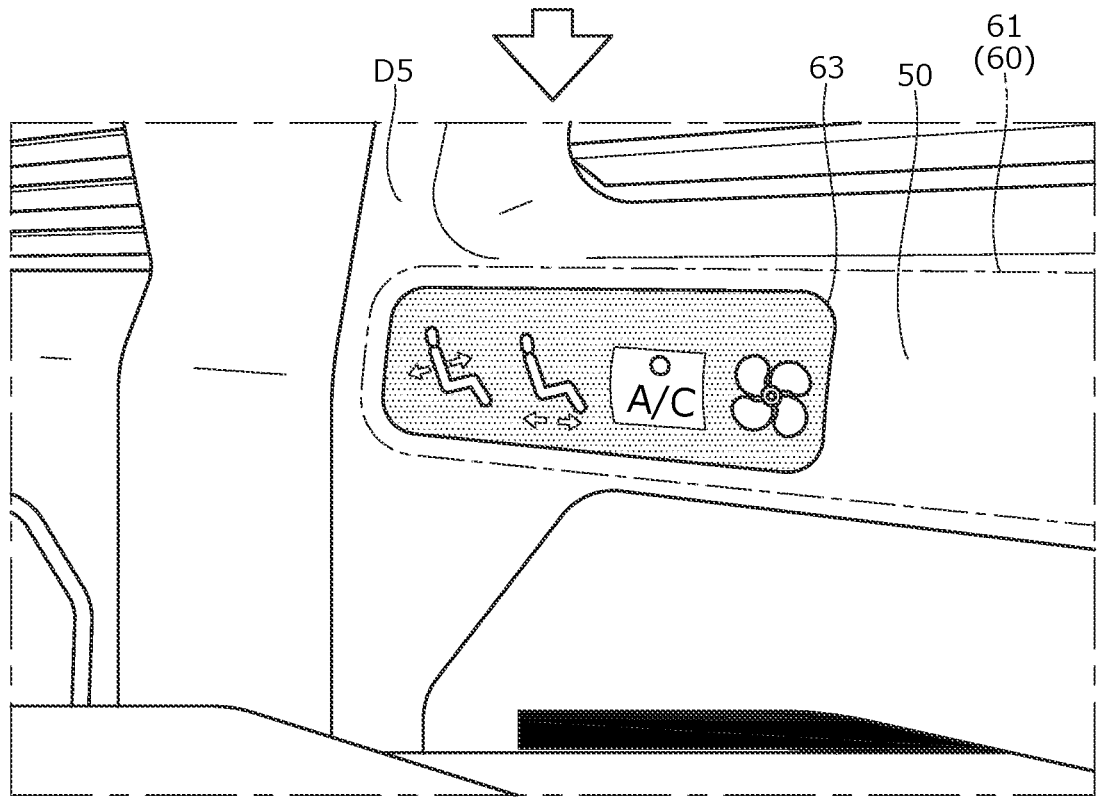

A specific example of the fifth embodiment will be described with reference to FIG. 13. FIG. 13 is a view showing the touch panel 60 on which the operating unit 63 is displayed and which is provided on a door D5, the upper part is a view showing the state of the operating unit 63 before being touched by an occupant, and the lower part is a view showing the state of the operating unit 63 after being touched.

As shown at the upper part of FIG. 13, in a state where a touch operation of the occupant is not received, a periphery of the switches 64 is displayed, for example, in the same color as the color of the door lining 50. For this reason, the occupant can recognize that the operating unit 63 is not touched.

When the occupant touches the operating unit 63, the operating unit 63 is displayed in a color different from the color of a periphery. For example, as shown at the lower part of FIG. 13, the background color of an icon for each switch changes. Since the color of the operating unit 63 becomes different from the color of the periphery, the occupant can recognize that the operating unit 63 is used. The color of the operating unit 63 may return to the original color due to a button operation performed by the occupant when cleaning the door lining 50. In addition, the color of the operating unit 63 may be set to automatically return to the original color after a certain time has elapsed.

Incidentally, when the operating unit 63 is touched by the occupant, the display position of the operating unit 63 may be at another location on the touch panel 60 which is not touched by the occupant.

Sixth Embodiment

An interior structure for a vehicle that is a sixth embodiment of the present invention will be described.

JP 2017-114382 A discloses a structure in which an operating switch that is a capacitive sensor for operating vehicle functions is provided on an interior member such as a door armrest of a vehicle. In the related art, the cooperation of such an operating switch with an external terminal such as a mobile communication terminal has not been considered. If the display of the operating switch is changeable based on communication with the external terminal such as a mobile communication terminal, convenience is improved.

Technical Problem

An interior structure for a vehicle that is the sixth embodiment has been made in view of the foregoing problem, and an object of the sixth embodiment is to provide an interior structure for a vehicle which can change a display of an operating unit based on communication from a mobile communication terminal.

Solution to Problem

The foregoing problem is solved by an interior structure for a vehicle including: an interior member including a touch panel that receives a touch operation of an occupant. The touch panel includes a display unit capable of displaying an operating unit corresponding to a predetermined function of the vehicle, at a predetermined position. A display of the operating unit is configured to be controllable based on a communication from a mobile communication terminal.

In addition, a seat mounted in the vehicle may be switchable between at least a normal mode in which the seat is in a normal seating position and a relaxation mode in which the seat is in a seating position lower than the normal seating position. The operating unit may include a switching switch for switching between the normal mode and the relaxation mode. In a case where a predetermined communication is received from the mobile communication terminal when the seat is in the relaxation mode, the display of the operating unit may be changed.

The predetermined communication may include information from the mobile communication terminal outside the vehicle, the information indicating that there is an intention to return to the vehicle. When the information is received, the display unit may highlight and display the switching switch on the operating unit so as to indicate returning from the relaxation mode to the normal mode, or may be changed to display the switching switch at an easily operable position and may display a message meaning that a user outside the vehicle returns to the vehicle.

Advantageous Effects of Invention

According to the sixth embodiment, it is possible to provide the interior structure for a vehicle which can change the display of the operating unit based on communication from the mobile information terminal, and accordingly, user convenience can be improved.

Specific Example

Figure 14:
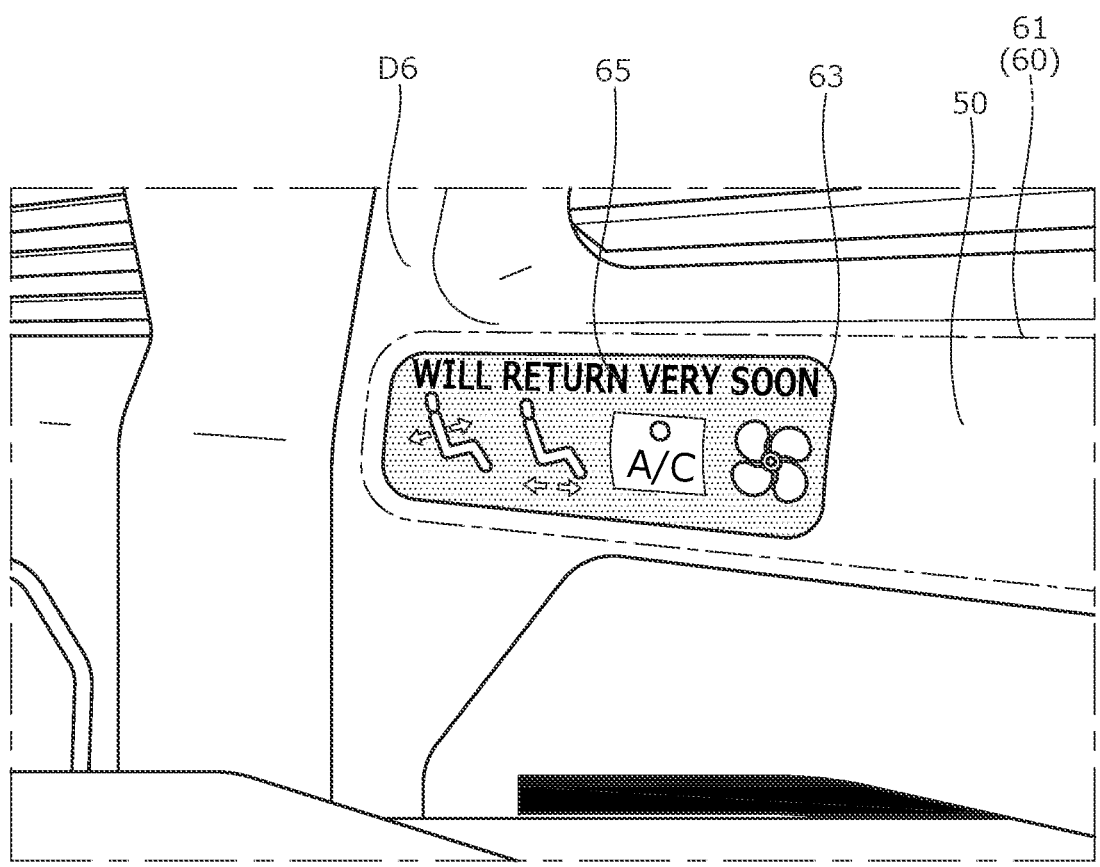
FIG. 14 is a view showing the operating unit on which a message is displayed.

A specific example of the sixth embodiment will be described with reference to FIG. 14. FIG. 14 is a view showing an upper end portion of a vehicle door D6 capable of changing a display based on communication from a mobile information terminal.

The touch panel 60 is provided at the upper end portion of the vehicle door D, in more detail, the upper end portion of the door lining 50 provided on an interior side of the vehicle door D6. The operating unit 63 is displayed on the touch panel 60. Since the configurations of the touch panel 60 and the operating unit 63 are same as that of the touch panel 60 of the third embodiment, the detailed description thereof will be omitted.

The touch panel 60 is a touch panel display, and display contents are controlled by an ECU (not shown) installed inside a vehicle. When the ECU receives a message from the mobile terminal outside the vehicle, as shown in FIG. 14, a message 65 can be displayed at an upper side of the operating unit 63. The content of the displayed message 65 may be a content transmitted from the mobile terminal as it is. In addition, a message determined in advance according to a transmitted signal may be displayed.

Incidentally, in a case where the inside of the vehicle is in a relaxation mode, for example, when the ECU receives a specific message, for example, a message indicating returning to the vehicle, the mode switching switch may be highlighted and displayed on the operating unit 63 so as to indicate returning from the relaxation mode to a normal mode. In addition, the display position of the operating unit 63 may be changed such that the mode switching switch is located to be easily operated by an occupant.

Seventh Embodiment

An interior structure for a vehicle that is a seventh embodiment of the present invention will be described.

JP 2017-114382 A discloses a structure in which an operating switch that is a capacitive sensor for operating vehicle functions is provided on an interior member such as a door armrest of a vehicle. In the operating switch of the related art, operating buttons for operating a plurality of vehicle functions are grouped, and the operating switch in which the operating buttons are grouped is provided at a predetermined position on the interior member. For this reason, it is inconvenient if an occupant has to reach out to the predetermined position for operation.

Technical Problem

An interior structure for a vehicle that is the seventh embodiment has been made in view of the foregoing problem, and an object of the seventh embodiment is to provide an interior structure for a vehicle in which a portion serving as an operating switch (operating unit) can be removed and used inside a vehicle as a remote controller.

Solution to Problem

The foregoing problem is solved by an interior structure for a vehicle according to the seventh embodiment including: an interior member including a touch panel that receives a touch operation of an occupant. The touch panel is provided on an operating device configured to be communicatable with a control device for the vehicle. The operating device is configured to be accommodatable in an accommodation recess provided in the interior member of the vehicle.

In addition, a plurality of the accommodation recesses may be formed in the interior member of the vehicle. The interior member of the vehicle is, for example, an interior trim such as a door lining or a pillar, or an instrument panel.

In addition, the operating device may include a rechargeable battery, and may be configured to receive a supply of electric power from a power supply unit provided in the accommodation recess.

Advantageous Effects of Invention

According to the seventh embodiment, it is possible to provide the interior structure for a vehicle in which a portion serving as an operating switch (operating unit) can be removed and used inside the vehicle as a remote controller.

Specific Example

Figure 15:
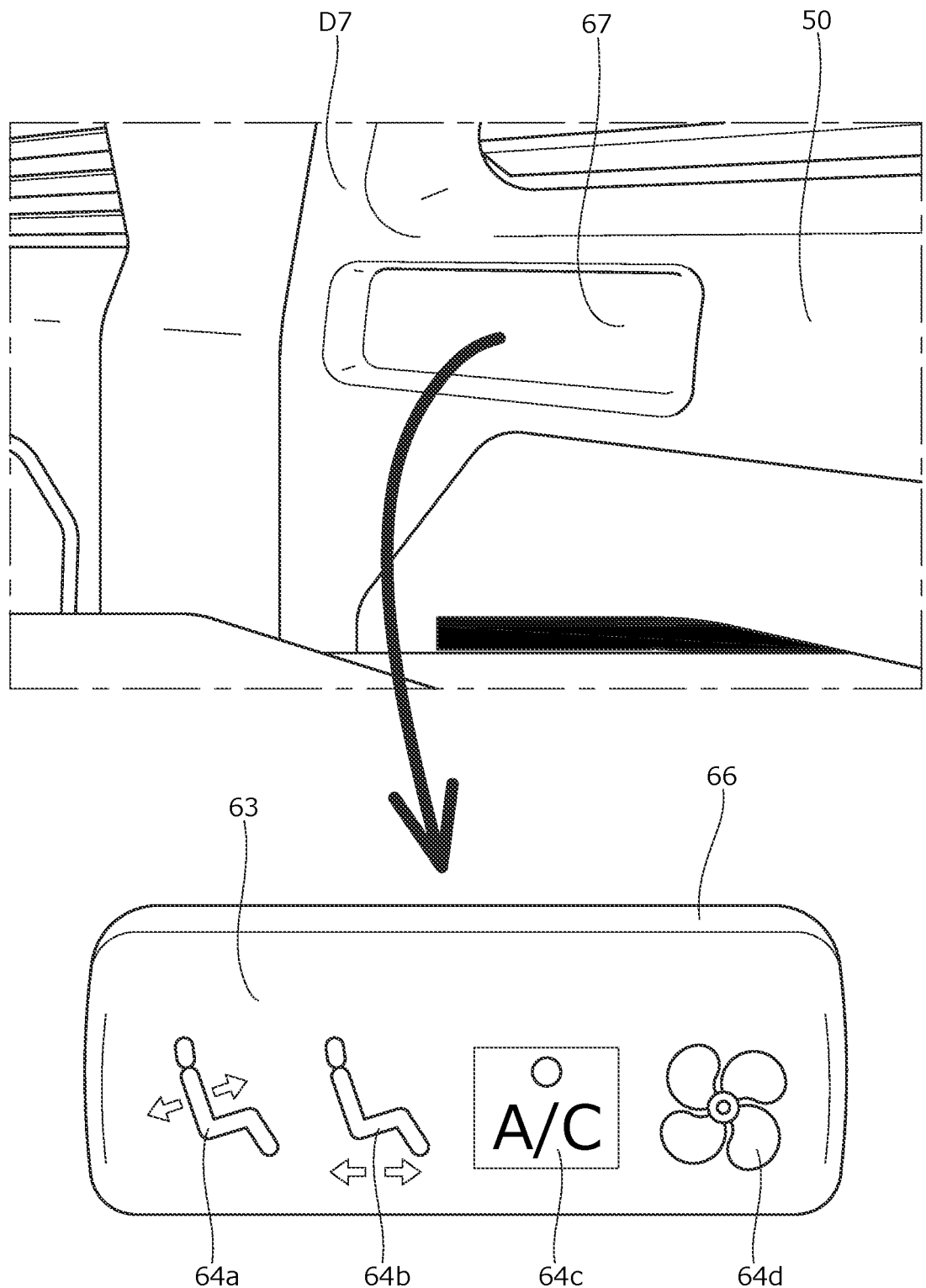
FIG. 15 is a view showing an operating device that is detachably provided.

A specific example of the seventh embodiment will be described with reference to FIG. 15. FIG. 15 is a view showing an operating device 66 that is detachably provided on a door D7.

The operating device 66 includes a touch panel display as an operating surface to be touched by an occupant, and can display the operating unit 63. Similarly to the operating unit 63 of the third embodiment, the operating unit 63 of the operating device 66 can display a plurality of the switches 64a to 64d, and can be used to operate each function of a vehicle.

The operating device 66 includes a wireless communication unit, and is configured to be wirelessly communicatable with a control device (ECU) provided in the vehicle. Wireless communication may be connected, for example, via a short-range wireless connection such as Bluetooth (registered trademark) or Wifi (registered trademark). In addition, data may be transmitted to and received from the ECU using the operating device 66 and infrared rays.

The operating device 66 is accommodatable in an accommodation recess 67 formed in the door lining 50 of the door D7. In addition, the operating device 66 is easily attachable and detachable by the occupant, and can be used anywhere inside the vehicle as a remote controller. The operating device 66 is fixed to the accommodation recess 67 using, for example, a magnet. In addition, the same accommodation recess 67 is also provided in another interior trim inside the vehicle. The occupant can remove the operating device 66 from the door D7, and can attach the operating device 66 to, for example, the accommodation recess 67 provided in an instrument panel.

The operating device 66 is operated by a built-in primary battery or rechargeable battery. When the operating device 66 includes a rechargeable battery, electric power may be provided from a power supply unit provided in the accommodation recess 67, to the rechargeable battery. The operating device 66 may be automatically charged when accommodated in the accommodation recess 67.

In such a manner, by detachably providing the operating device 66 on the door D7, the occupant can operate the operating device 66 anywhere in a vehicle interior, so that comfort in the vehicle interior is improved.

Eighth Embodiment

A vehicle that is an eighth embodiment of the present invention will be described.

JP 2009-125276 A discloses a technique in which when a predetermined time has elapsed after an occupant seated in a seat starts sleeping, the occupant is irradiated with light so as to be able to induce wakefulness in the occupant. On the other hand, in recent years, utilizing a vehicle interior space as a work space or a relaxing living space has been proposed, and not only using an illumination device that induces wakefulness in the occupant but also improving the comfort of the occupant in the vehicle interior space are required.

Technical Problem

A vehicle that is the eighth embodiment has been made in view of the foregoing problem, and an object of the eighth embodiment is to provide a vehicle capable of providing illumination corresponding to a mode in which an occupant uses a vehicle interior space, and improving the vehicle interior comfort of the occupant.

Solution to Problem

The foregoing problem is solved by a vehicle that is the eighth embodiment including: a seat, an interior component, and an illumination device provided in a vehicle interior space; and a vehicle interior mode adjustment system that stores a plurality of mode information in which position information of the seat and the interior component in the vehicle interior space is registered in advance, and that adjusts positions of the seat and the interior component in the vehicle interior space when an occupant selects one from the plurality of mode information. The plurality of mode information includes at least a concentration mode that encourages the occupant to concentrate, and a relaxation mode that encourages the occupant to relax. When the concentration mode is selected by the occupant, a central visual field of the occupant is irradiated with illumination light of the illumination device, and when the relaxation mode is selected, a peripheral visual field of the occupant is irradiated with the illumination light.

In addition, in the concentration mode, position information in a state where a backrest of the seat is upright may be stored, and when the concentration mode is selected, the illumination may illuminate the central visual field at hands of the seated occupant of the seat. Further, when a table is provided in front of the occupant, the illumination may illuminate the table.

In the relaxation mode, position information in a state where the backrest of the seat is reclined may be stored, and when the relaxation mode is selected, the illumination may illuminate, for example, a peripheral visual field of the occupant from the side portion of the vehicle interior.

In addition, an illumination brightness in a case of the relaxation mode may be set to be lower than an illumination brightness in a case of the concentration mode. The occupant can be brought into a more restful state by decreasing the illumination brightness in the relaxation mode.

The seat may further include a biosensor that acquires biological information of the seated occupant, and an illumination brightness, an illumination color, an illumination angle, and the like may be changed according to the information acquired from the biosensor.

Advantageous Effects of Invention

According to the vehicle of the eighth embodiment, it is possible to provide illumination corresponding to a mode in which the occupant uses the vehicle interior space.

Specific Example

Figure 16A:
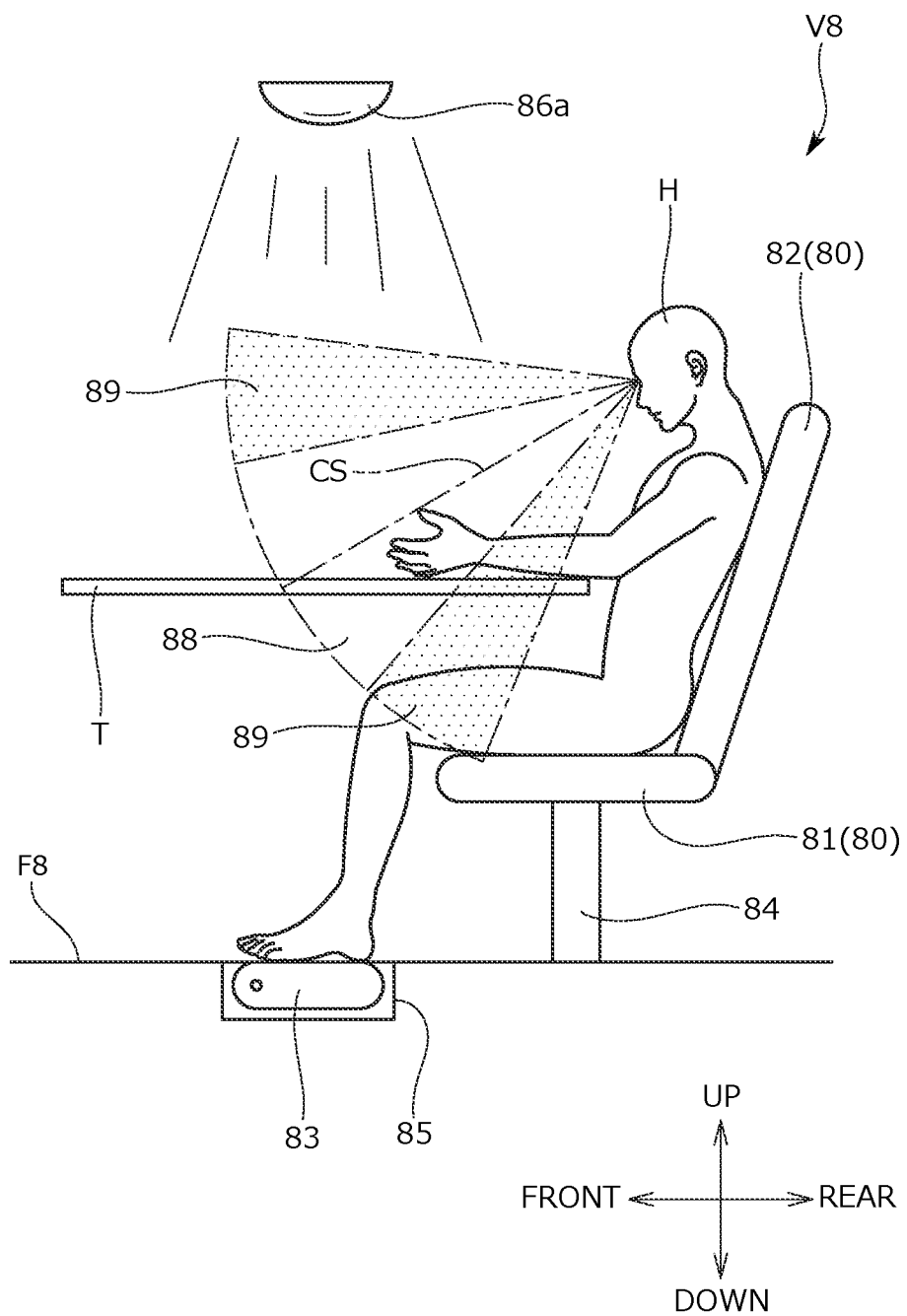
FIG. 16A is a view showing a vehicle seat and an illumination device in a concentration mode.
Figure 16B:
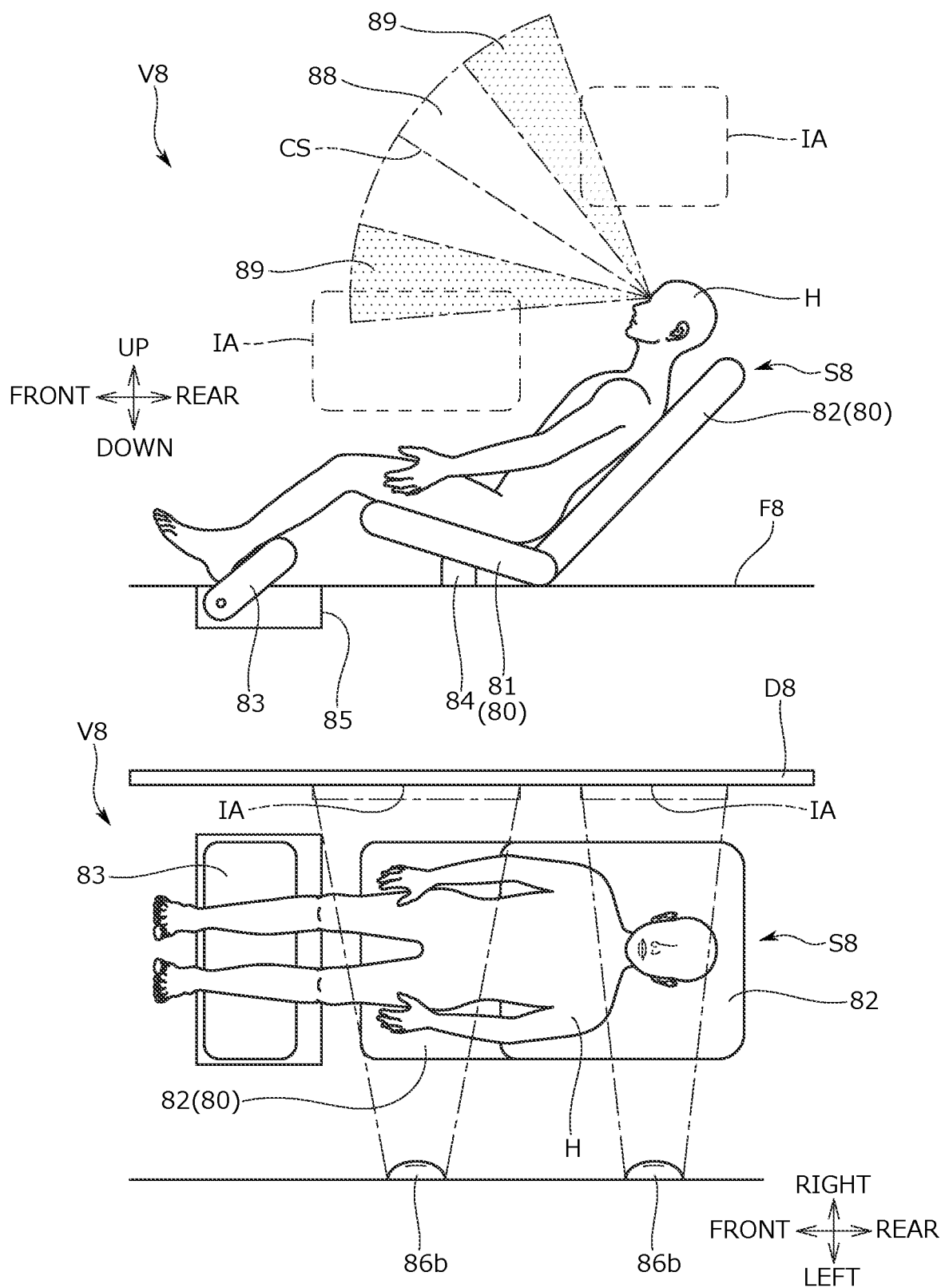
FIG. 16B is a view showing the vehicle seat and the illumination device in a relaxation mode, the upper part is a side view, and the lower part is a view of the seat when viewed from above.

A specific example of a vehicle V8 of the eighth embodiment will be described with reference to FIGS. 16A and 16B. FIG. 16A is a view showing a vehicle seat and an illumination device in a concentration mode. FIG. 16B is a view showing a positional relationship between the seat and the irradiation range of the illumination in a relaxation mode, the upper part is a side view, and the lower part is a top view.

In the vehicle V8, a vehicle seat S8 and a plurality of illumination devices 86a and 86b are provided in a vehicle interior space. The vehicle seat S8 includes a seat body 80 in which an occupant H is seated, and the seat body 80 includes a seat cushion 81 that supports the buttocks of the occupant H and a seat back 82 serving as a backrest for the occupant H. A lower end of the seat back 82 and a rear end portion of the seat cushion 81 are connected by a reclining mechanism, and the seat back 82 can be reclined with respect to the seat cushion 81.

In addition, the seat body 80 is attached to a vehicle body floor F8 such that the height of the seat body 80 can be adjusted. Specifically, the seat body 80 is supported by a support member 84 on the vehicle body floor, and the height of the seat body 80 is changed by moving the support member 84 up and down.

In addition, a leg support member 83 is rotatably provided in front of the seat body 80, and the thighs of the occupant H can be supported in accordance with the height of the seat body 80. The leg support member 83 is accommodatable in an accommodation recess 85 formed in the vehicle body floor F8.

The vehicle V8 stores mode information in which position information indicating the state of the vehicle seat S8 in the vehicle interior space is registered in advance. A plurality of mode information is, for example, stored in a storage unit of a vehicle interior mode adjustment system mounted in the vehicle V8. The vehicle interior mode adjustment system is, for example, executed by an ECU mounted in the vehicle V8, the reclining mechanism, and a height adjustment mechanism.

The occupant H can select one from the plurality of mode information registered in the vehicle interior mode adjustment system, using an input device provided inside the vehicle, for example, a button or a touch panel. The vehicle interior mode adjustment system adjusts the reclining angle or height of the vehicle seat S8 in the vehicle interior space, and the position of the illumination device 86a that is an interior component, based on the selected mode information. The mode information includes the concentration mode that encourages the occupant H to concentrate, and a relaxation mode that encourages the occupant H to relax.

The position that is irradiated with illumination light by the illumination device may be set based on the effective visual field of the occupant. The human visual field is classified into a central visual field 88 and a peripheral visual field 89. The central visual field 88 is a region where the visual acuity is high and fine details can be seen, and the peripheral visual field 89 is a region other than the central visual field 88, in which the visual acuity is low. In the case of a vertical visual field, the central visual field 88 is within a range of approximately 20 degrees above and below a center CS of the visual field (fixation point of view where the eyes see a single point without movement), and the peripheral visual field 89 is within a range of 20 degrees to 60 degrees thereabove and a range of 20 degrees to 70 degrees therebelow. In the case of a horizontal visual field, the central visual field 88 is within a range of approximately 30 degrees on each of the right and left sides from the center CS of the visual field, and the peripheral visual field 89 is within approximately 30 degrees to approximately 100 degrees on each of the right and left sides.

When the concentration mode is selected, as shown in FIG. 16A, a table T is disposed in front of the occupant H, and the vehicle seat S8 is in a state where the seat back 82 is upright. The position is adjusted to a height at which the occupant H can read or work, and the leg support member 83 is rotated and accommodated in the accommodation recess 85. At this time, the illumination device 86a irradiates the central visual field 88 of the occupant H, more specifically, the hands of the occupant with illumination light. As shown in FIG. 16A, when the table T is located in front of the occupant H, the table T may be illuminated. The occupant H is allowed to concentrate and read or work by causing the illumination device to illuminate the central visual field 88 of the occupant.

When the relaxation mode is selected, as shown in FIG. 16B, the height of the seat body 80 is lower than in the concentration mode, and the seat back 82 is further inclined rearward. Further, the front of the seat cushion 81 is raised, and the occupant H can be seated in a relaxed state. Position information of the seat in the case of the relaxation mode is stored in advance. Then, when the relaxation mode is selected, the illumination device 86b provided on a side portion of a vehicle interior irradiates an illumination range IA including the peripheral visual field 89 of the occupant, with illumination light.

The occupant H can be guided into a restful state by irradiating the peripheral visual field 89 with illumination light while avoiding the central visual field 88 of the occupant H. In this case, the occupant H can be guided into a more restful state by setting the illumination brightness to be lower than in the concentration mode.

The illumination brightness or the like may be set to a predetermined brightness for the relaxation mode. For example, a brightness lower than a brightness in an excursion mode is set. When the seat is provided with a biosensor that acquires biological information (for example, heart rate, pulse wave, electrocardiogram, and the like) of the occupant, the brightness of illumination light, irradiation angle, or the like of the illumination device 86a may be changed according to the biological information acquired from the biosensor.

The vehicle V8 of the eighth embodiment can provide illumination corresponding to a mode in which the occupant H uses the vehicle interior space, so that vehicle interior comfort is improved.

Ninth Embodiment

A vehicle that is a ninth embodiment of the present invention will be described.

JP 2009-125276 A discloses a technique in which when a predetermined time has elapsed after an occupant seated in a seat starts sleeping, the occupant is irradiated with light so as to be able to induce wakefulness in the occupant. On the other hand, in the technique disclosed in the foregoing patent literatures, light from the outside of a vehicle has not been taken into consideration, and since sleep is disturbed when light is incident from the outside of the vehicle, the situation where the technique can be used is limited, and there is room for improvement in ensuring that sleep is not disturbed due to light from the outside of the vehicle.

Technical Problem

A vehicle that is the ninth embodiment has been made in view of the foregoing problem, and an object of the ninth embodiment is to provide a vehicle that allows an occupant to sleep regardless of situations outside the vehicle, and that can pleasantly induce wakefulness in the occupant after a predetermined time has elapsed.

Solution to Problem

The foregoing problem is solved by a vehicle that is the ninth embodiment including: a sunshade capable of shielding light from an outside of the vehicle; and a seat. The sunshade is provided to be movable in an up to down direction on a vehicle interior side of a glass provided on a vehicle body, by shade drive means. The seat is configured such that a seat back of the seat is tiltable to a predetermined upright position by seat back drive mean after a time set by time setting means has elapsed. The shade drive means operates to gradually lower the sunshade after the set time has elapsed.

In addition, the shade drive means may shield the glass by operating the shade upward in response to an operation of an occupant or as the elapse of the time starts.

In addition, the seat back drive mean may tilt the seat back to a predetermined angle in response to an operation of the occupant or as the elapse of the time starts.

In addition, the predetermined angle of the seat back may be set according to the set time. For example, in the case of a short-time relaxation, the predetermined angle is set to a shallow angle, so that the occupant easily wakes up.

In addition, after a predetermined time has elapsed from the operation of lowering the sunshade, the seat back may be tilted to the upright position. The vehicle interior is gradually brightened, so that wakefulness can be naturally induced in the occupant before the body of the occupant is raised.

In addition, the vehicle may further include a sensor capable of detecting a brightness of the light from the outside of the vehicle, an angle of the light, or the like, and a height of the sunshade may be controlled based on a detection result of the sensor.

Advantageous Effects of Invention

According to the ninth embodiment, it is possible to provide the vehicle that allows the occupant to sleep regardless of situations outside the vehicle, and that can pleasantly induce wakefulness in the occupant after the predetermined time has elapsed.

Specific Example

Figure 17:
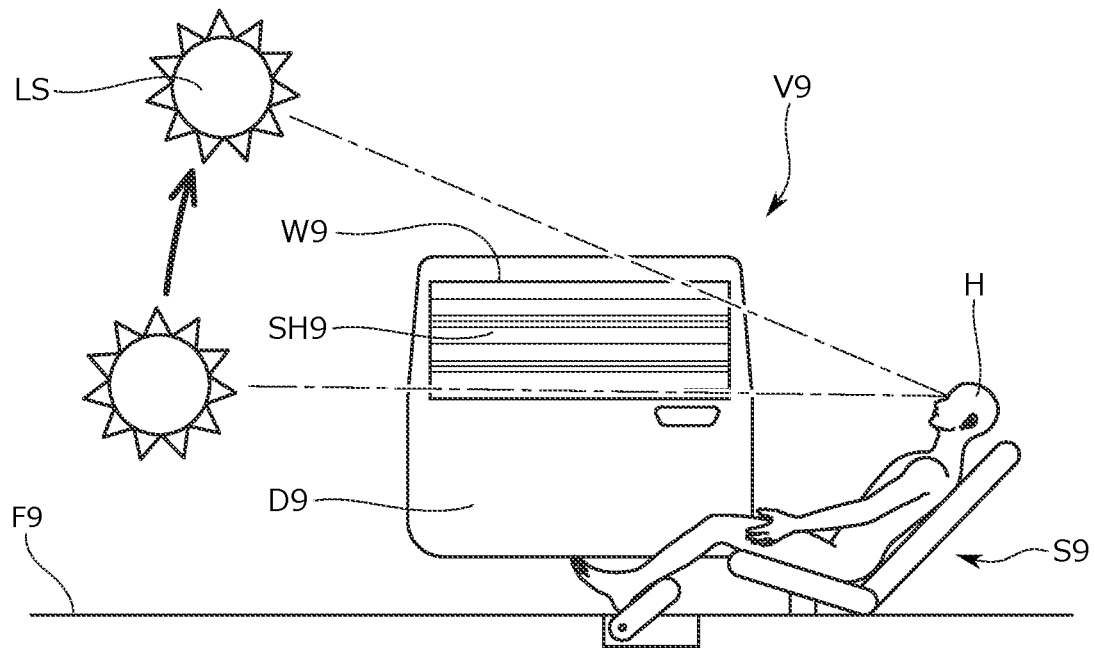
FIG. 17 is a view showing a positional relationship between the position of the sun that is a light source and a sunshade.
Figure 17:
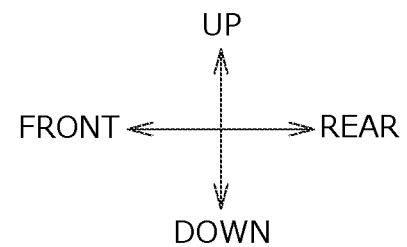

A specific example of a vehicle V9 of the ninth embodiment will be described with reference to FIG. 17. FIG. 17 is a view showing a positional relationship between the position of a sun LS that is a light source and a sunshade SH9.

The vehicle V9 includes the sunshade SH9 provided on a window W9 of a door 9 to be able to shield light from the outside of the vehicle, and a vehicle seat S9 provided on a floor F9.

The sunshade SH9 is provided to be movable in the up to down direction on a vehicle interior side of a glass of the window W9 by shade drive means (not shown).

The vehicle seat S9 includes a seat cushion and a seat back, and the inclination angle of the seat back with respect to the seat cushion is changeable by a reclining mechanism (seat back drive mean).

The vehicle seat S9 is configured such that the seat back is tiltable to a predetermined upright position by the reclining mechanism after a time set by time setting means has elapsed. The reclining mechanism and the shade drive means cooperate with each other, and when the seat back reaches the upright position, namely, after the set time has elapsed, the shade drive means operates to gradually lower the sunshade SH9.

In a relaxation mode, the sunshade shields light of the light source, so that an occupant is allowed to sleep regardless of situations outside the vehicle. In addition, after a predetermined time has elapsed, the sunshade is lowered according to the time by the shade drive means, and the seat back is moved to the upright position, so that the occupant is exposed to light from the outside of the vehicle. Therefore, wakefulness can be pleasantly induced in the occupant H.

Incidentally, when a sensor capable of detecting a brightness of light from the outside of the vehicle, an angle of light, or the like is provided, the height of the sunshade SH9 may be controlled based on a detection result of the sensor.

Tenth Embodiment

A conveyance seat that is a tenth embodiment of the present invention will be described.

JP 2009-125276 A discloses a vehicle seat in which a seat back is reclined, a seat cushion is lowered, or an ottoman is moved to a use position when an occupant sleeps in a vehicle interior.

On the other hand, it can be considered that the seating position of a seat body including a seat back and a seat cushion can be lowered to allow taking a relaxed posture while ensuring a wider vehicle interior space. However, when the seat body includes a leg support member (ottoman), the amount of lowering of the seat body is limited by the leg support member. For this reason, both providing the leg support member and lowering the seating position of the seat body are required.

Technical Problem

A conveyance seat that the tenth embodiment has been made in view of the foregoing problems, and an object of the tenth embodiment is to provide a conveyance seat in which a seating position of a seat body can be lowered while providing a leg support member.

Solution to Problem

The foregoing problems are solved by a conveyance seat including: a seat body and a leg support member. The seat body is switchable between at least a normal seating position and a lowered position lower than the normal seating position. The leg support member is rotatably provided in a floor, includes a rotary shaft on a front end side, and is configured to be movable between a use position where a rear portion of the leg support member is moved upward and a stowed position where the leg support member is accommodated in a floor recess. The leg support member moves to the use position when the seat body is in the lowered position.

In addition, when the seat body is in the lowered position, a mode of the seat body may be changeable to a relaxed state where a seat back is tilted rearward and a front portion of a seat cushion is lifted upward, and the leg support member may move to the use position in conjunction with the change of the mode of the seat body to the relaxed state.

In addition, the seat body may further include a sensor that measures a physique of a seated occupant, and a movement angle of the leg support member may be changeable according to the measured physique.

In addition, an upper surface of the leg support member may be set to the same height as a height of the floor when the leg support member is in the stowed position. When the leg support member is in the stowed position, the upper surface of the leg support member and the floor are flush with each other, so that the occurrence of the feet of the occupant being caught can be suppressed.

In addition, an upper surface of the leg support member may be provided to protrude upward from the stowed position or to be adjustable in height so as to protrude upward. Accordingly, when the seat body is in the normal seating position, the occupant can use the leg support member as a footrest.

Advantageous Effects of Invention

According to the conveyance seat of the tenth embodiment, since the leg support member is provided in the floor, the seating position of the seat body can be lowered separately from the position of the leg support member. For this reason, it is possible to provide the conveyance seat in which the seating position of the seat body can be lowered while providing the leg support member.

Specific Example

The vehicle seat S that is a specific example of the tenth embodiment will be described with reference to FIG. 18.

Figure 18:
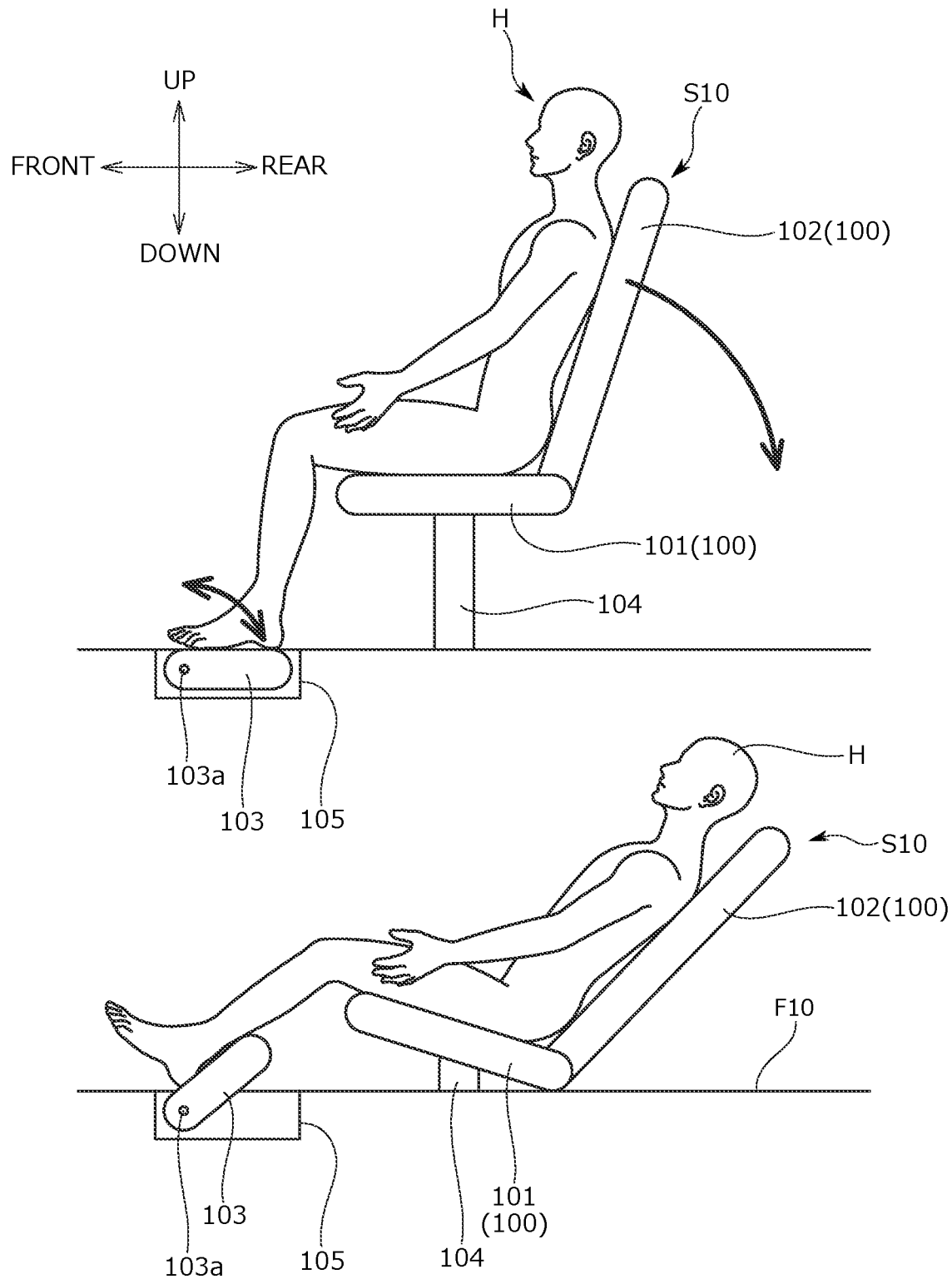
FIG. 18 is a side view showing a vehicle seat, the upper part is a view of the seat in a normal seating position, and the lower part is a view of the seat in a lowered position.

FIG. 18 is an explanatory view schematically showing a configuration of a vehicle seat mounted in a vehicle, the upper part shows a case where a seat body 100 is in a normal seating position, and the lower part shows a case where the seat body 100 is in a lowered position.

The vehicle seat S includes the seat body 100 in which the occupant H is seated. The seat body 100 includes a seat cushion 101 that supports the buttocks of the occupant H, and a seat back 102 serving as a backrest for the occupant H. The seat back 102 is tiltably connected to the seat cushion 101. Specifically, a lower end portion of the seat back 102 and a rear end portion of the seat cushion 101 are connected by a reclining mechanism, and the seat back 102 can reclined rearward.

The seat body 100 is attached to a vehicle body floor F such that the height of the seat body 100 can be adjusted, and is switchable between the normal seating position shown at the upper part of FIG. 18 and the lowered position shown at the lower part of FIG. 18. Specifically, the seat cushion 101 is provided with a support member 104 that supports the seat body 100 and that is movable up and down, and the seating position of the seat body 100 is changeable by moving the support member 104 up and down using a height adjustment function.

When the seat body 100 is in the lowered position, the seat back 102 is reclined rearward. In addition, in the seat cushion 101, a front portion of the seat cushion 101 is lifted upward, so that the seated occupant H can be in a relaxed state.

The vehicle seat S includes a leg support member 103 in front of the seat body 100. The leg support member 103 is provided in the vehicle body floor F so as to be rotatable by a rotation mechanism (not shown). A rotary shaft 103a is provided at the front of the leg support member 103, and when the leg support member 103 rotates around the rotary shaft to a use position, a rear end portion of the leg support member 103 can be moved upward. In addition, an accommodation recess 105 that accommodates the leg support member 103 is provided in the vehicle body floor F, and as a stowed position as shown at the upper part of FIG. 19, the leg support member 103 can be stowed in the vehicle body floor F.

When the seating position of the seat body 100 is switched from the normal seating position to the lowered position, the leg support member 103 is rotated by the rotation mechanism to move to the use position. The rear end portion of the leg support member 103 moves upward and supports the calves of the occupant H.

The seat body 100 includes a sensor that measures a physique of the seated occupant. For example, an infrared sensor, a pressure sensor, or the like is disposed on a seating surface to measure a weight or foot length of the seated occupant. The rotation angle of the leg support member is changeable according to the measured physique.

An upper surface of the leg support member 103 is configured to be set to the same height as that of a vehicle body floor F10. For this reason, when the leg support member 103 is accommodated, the occurrence of the feet of the occupant H being caught on the leg support member 103 can be suppressed.

In such a manner, since the leg support member 103 is provided separately from the seat body 100, the seating position of the seat body 100 can be lowered regardless of the state of the leg support member 103. In other words, the leg support member 103 can also be provided in a vehicle seat S10 in which the seating position of the seat body 100 can be lowered closer to a vehicle body floor F10.

Another example of the first embodiment and the second embodiment will be supplementarily noted as follows.
(Supplementary Note 1)

There is provided an attachment structure for a functional component to be attached to an interior member of a conveyance.

The functional component includes a first functional component to be attached to a fitting portion of the interior member, the fitting portion being capable of supplying electric power, and a second functional component to be attached to the first functional component.

The first functional component includes an opening portion for connecting the second functional component.

The second functional component includes an insertion portion to be inserted into the opening portion.
(Supplementary Note 2)

In the attachment structure for the functional component according to Supplementary Note 1, the fitting portion of the interior member is formed in a predetermined groove shape.

The first functional component includes a connection portion having a protruding shape, formed according to the predetermined groove shape, and fittable into the fitting portion.
(Supplementary Note 3)

In the attachment structure for the functional component according to Supplementary Note 2, the fitting portion of the interior member is provided inside a recess recessed from a surface of the interior member, and a flap is provided around an opening of the recess.
(Supplementary Note 4)

In the attachment structure for the functional component according to Supplementary Note 1, the first functional component includes a first power receiving unit that receives the supply of the electric power from the fitting portion, and a power supply unit that supplies the electric power to the first functional component and the second functional component.

The second functional component includes a second power receiving unit that receives the supply of the electric power from the first functional component in a state where the insertion portion is inserted into the opening portion.
(Supplementary Note 5)

In the attachment structure for the functional component according to Supplementary Note 4, the power supply unit includes a power transmission coil, the second power receiving unit of the second functional component is a power receiving coil, and the electric power is supplied from the power supply unit of the first functional component to the second power receiving unit of the second functional component in a non-contact manner by bringing the power receiving coil closer to the power transmission coil.
(Supplementary Note 6)

In the attachment structure for the functional component according to Supplementary Note 1, the second functional component includes a table portion, and the table portion is foldable.
(Supplementary Note 7)

In the attachment structure for the functional component according to Supplementary Note 1, the interior member is a door trim for a conveyance.

(Supplementary Note 8)

In the attachment structure for the functional component according to Supplementary Note 1, the interior member is a conveyance seat.

(Supplementary Note 9)

In the attachment structure for the functional component according to Supplementary Note 3, the interior member is a conveyance seat that is foldable by putting a seating portion upright, the recess is provided on a back surface of the seating portion, and the fitting portion to which the connection portion of the first functional component and/or the insertion portion of the second functional component is attached is provided inside the recess.

(Supplementary Note 10)

There is provided an interior member including: the attachment structure for the functional component according to any one of Supplementary Notes 1 to 9.

(Supplementary Note 11)

There is provided a shade device for a conveyance, the device including: a first light-shielding component provided on an interior side of a window glass of the conveyance; and a second light-shielding component provided at a predetermined distance from the first light-shielding component, and having a transmittance different from a transmittance of the first light-shielding component.

(Supplementary Note 12)

In the shade device for a conveyance according to Supplementary Note 11, the first light-shielding component is formed to depict a predetermined pattern on the interior side of the window glass.

(Supplementary Note 13)

In the shade device for a conveyance according to Supplementary Note 11, the second light-shielding component is a shade provided on the interior side of the window glass, and is movable in an up to down direction.

(Supplementary Note 14)

In the shade device for a conveyance according to Supplementary Note 11, the second light-shielding component is formed such that the transmittance changes from a top toward a bottom.

(Supplementary Note 15)

In the shade device for a conveyance according to Supplementary Note 14, the second light-shielding component is formed such that the transmittance decreases from a top toward a bottom.

REFERENCE SIGNS LIST

V: vehicle
DT: door trim
D: door
RG: rear gate
SW: side wall
S: seat
  S1: driver seat
  S2: passenger seat
  S3, S4: middle seat
  S5, S6: third seat
W: window
SH: shade device
P: pad
T: skin
1: functional component
2: fitting portion
3: recess
4: flap
5: power supply mechanism
6: magnetic field
10: armrest (first functional component)
  10a: base material
11: connection portion
12: opening portion
13: first power receiving unit
14: power supply unit
  14a: first power supply circuit
  14b: second power supply circuit
  14c: power transmission coil
15: power storage unit
16: speaker
17: latch
20: table device (second functional component)
21: insertion portion
22: power receiving coil (second power receiving unit)
23: table portion
24: hinge
25: USB port
27: latch
28: latch unlocking portion
30: seat back
31: seat cushion
  31a: back surface
40: window glass
41: first light-shielding component
42: second light-shielding component
  42a: opening
43: film
D3: vehicle door
50: door lining
51: upper table
52: lower table
53: attachment portion
60: touch panel (display unit)
61: upper touch panel
62: lower touch panel
63: operating unit
64, 64a to 64d: switch
65: message
66: operating device
67: accommodation recess
V8: vehicle
F8: vehicle body floor
S8: vehicle seat
CS: center of visual field
IA: illumination range
80: seat body
81: seat cushion
82: seat back
83: leg support member
84: support member
85: accommodation recess
88: central visual field
89: peripheral visual field
V9: vehicle
W9: window
S9: vehicle seat
SH9: sunshade (shade device)
LS: sun (light source)
S10: vehicle seat (conveyance seat)
F10: vehicle body floor (floor)
100: seat body
101: seat cushion
102: seat back
103: leg support member
  103a: rotary shaft 104: support portion
105: accommodation recess

The invention claimed is:

1. An attachment structure for a functional component to be attached to an interior member of a conveyance,
wherein the functional component includes a first functional component to be attached to a fitting portion of the interior member, the fitting portion being capable of supplying electric power, and a second functional component to be attached to the first functional component,
the first functional component includes a first power receiver that receives the supply of the electric power from the fitting portion, a power storage that stores the electric power, a power supply that supplies the electric power to the first functional component and the second functional component, and an opening portion for connecting the second functional component, and
the second functional component includes an insertion portion to be inserted into the opening portion, and a second power receiver that receives the supply of the electric power from the first functional component in a state where the insertion portion is inserted into the opening portion.

2. The attachment structure for the functional component according to claim 1,
wherein the power supply includes a first power supply circuit that supplies the electric power to the first functional component, and a second power supply circuit that supplies the electric power to the second functional component, and is switchable between the first power supply circuit and the second power supply circuit.

3. The attachment structure for the functional component according to claim 1,
wherein the power supply includes a power transmission coil, the second power receiver of the second functional component includes a power receiving coil, and the electric power is supplied from the power supply of the first functional component to the second power receiver of the second functional component in a non-contact manner by bringing the power receiving coil closer to the power transmission coil.

4. The attachment structure for the functional component according to claim 1,
wherein the second functional component includes a table portion and a power supply jack capable of supplying the electric power supplied from the first functional component, to an external component.

5. The attachment structure for the functional component according to claim 4,
wherein the table portion of the second functional component is foldable.

6. The attachment structure for the functional component according to claim 1,
wherein the first functional component has a speaker function.

7. The attachment structure for the functional component according to claim 1,
wherein the interior member is a door trim for a conveyance.

8. The attachment structure for the functional component according to claim 1,
wherein the interior member is a conveyance seat.

9. The attachment structure for the functional component according to claim 8,
wherein the conveyance seat is a seat that is foldable by putting a seating portion upright, and includes a fitting portion to which the first functional component and/or the second functional component is attached and which is capable of supplying the electric power, on a back surface of the seating portion.

10. An interior member, comprising:
the attachment structure for the functional component according to claim 1.

* * * * *